United States Patent [19]

Ryu et al.

[11] Patent Number: 5,634,048
[45] Date of Patent: May 27, 1997

[54] DISTRIBUTED DATABASE SYSTEM HAVING A CENTER SYSTEM WITH A LINK FILE AND A METHOD FOR RETRIEVING DATA FROM SAME

[75] Inventors: Tadamitsu Ryu, Yokohama; Toshio Takahara, Kawasaki; Shingo Hirono, Tokyo; Tohru Matsumoto; Gen Kakehi, both of Yokohama; Yoshio Mogi, Tochigi; Takanori Fukatsu, Kawasaki; Masao Tomita, Omiya; Takashi Ohshiro, Kawasaki, all of Japan

[73] Assignee: Fujitsu Limited, Kawasaki, Japan

[21] Appl. No.: 402,725

[22] Filed: Mar. 13, 1995

Related U.S. Application Data

[63] Continuation of Ser. No. 700,161, May 14, 1991, abandoned.

[30] Foreign Application Priority Data

| Sep. 14, 1989 | [JP] | Japan | 1-239439 |
| Oct. 12, 1989 | [JP] | Japan | 1-265571 |
| Dec. 26, 1989 | [JP] | Japan | 1-337033 |
| Dec. 27, 1989 | [JP] | Japan | 1-339368 |

[51] Int. Cl.⁶ ................................................. G06F 17/30
[52] U.S. Cl. .............. 395/610; 395/200.04; 364/DIG. 1; 364/282.4
[58] Field of Search ................ 395/200.03, 200.09, 395/600, 650, 700

[56] References Cited

U.S. PATENT DOCUMENTS

| 4,825,354 | 4/1989 | Agrawal et al. | 395/600 |
| 4,897,781 | 1/1990 | Chang et al. | 395/600 |
| 4,897,782 | 1/1990 | Bennett et al. | 395/600 |
| 5,012,405 | 4/1991 | Nishikado et al. | 395/600 |
| 5,093,911 | 3/1992 | Parks et al. | 395/600 |
| 5,109,486 | 4/1992 | Seymour | 395/200 |
| 5,408,608 | 4/1995 | Ryu et al. | 395/600 |

FOREIGN PATENT DOCUMENTS

| 0204993 | 12/1986 | European Pat. Off. . |
| 0213277 | 3/1987 | European Pat. Off. . |
| 61-283943 | 12/1986 | Japan . |
| 62-125445 | 6/1987 | Japan . |
| 62-126458 | 6/1987 | Japan . |
| 62-198929 | 9/1987 | Japan . |

*Primary Examiner*—Wayne Amsbury
*Assistant Examiner*—John C. Loomis
*Attorney, Agent, or Firm*—Staas & Halsey

[57] ABSTRACT

A data retrieval method and apparatus in a distributed database system. Data is retrieved from a distributed database quickly with a minimum load on each terminal. A contents file is provided in each terminal, and a link file is provided in a center system to coordinate access to the distributed data in each terminal.

17 Claims, 21 Drawing Sheets

| DISPLAY SCREEN NAME | KEYWORD (KW) |
|---|---|
| PERSONNEL AFFAIRS 1 | EMPLOYEE NUMBER   BASE PAY   FAMILY PAY   OVERTIME ALLOWANCE |
| PERSONNEL AFFAIRS 2 | EMPLOYEE NUMBER   AGE   SEX   FAMILY MAKE-UP |
| ⋮ | ⋮ |

DISTRIBUTED DATABASE SYSTEM HAVING A CENTER SYSTEM WITH A LINK FILE AND A METHOD FOR RETRIEVING DATA FROM SAME

This application is a continuation, of application Ser. No. 07/700,161, filed May 14, 1991, now abandoned.

BACKGROUND OF THE INVENTION

1. Field of the Invention

This invention relates to a distributed database system and its data retrieval methods. In more detail, the invention relates to a system in which multiple terminals, each having distributed databases, are connected to a public network.

2. State of the Prior Art

FIG. 16 shows an example of the configuration of a distributed database system. Terminals 6, 7 and 8 are connected to a public network 5. Respective databases 6a, 7a and 8a are provided in terminals 6, 7, and 8 having contents designated 6b, 7b, and 8b.

The terminals 6, 7, and 8 contain the respective databases 6a, 7a, and 8a, and manage the respective contents 6b, 7b, and 8b. Upon receipt of a data retrieval request, the terminals 6, 7, and 8 locate the terminal managing the data using the appropriate contents. The terminals 6, 7 and 8 then access the terminal via the public network 5, and request data to be retrieved.

The following explains in detail the case where data retrieved is displayed.

In the distributed database, data processing is performed by carrying on a dialogue with a display screen at a terminal, such as a workstation. The terminal retrieves the screen needed for displaying. The display screen must be retrieved quickly in order to perform data processing efficiently.

To retrieve a display screen registered in the terminal, a keyword assigned to the display screen name is specified. The terminal has a keyword table managing one or more keywords assigned to each display screen name, as shown in FIG. 17. When a keyword is specified by a user, the terminal displays the name of the display screen to which the specified keyword is assigned. This is done according to the keyword table. Note that when more than one display screen is available, a list is displayed. A display screen is retrieved in this manner.

Keyword information assigned to the display screen of each terminal is not managed according to the concept of distributed processing.

However, when a keyword is specified, one terminal must search for that keyword. The search begins with the first display screen name of the keyword table and lists display screen names to which the specified keyword is assigned. Namely, the entire keyword table must be searched. A substantial amount of time is required to retrieve display screens. Retrieval time increases in proportion to the number of display screens registered.

In addition, since keyword information assigned to display screens of each terminal is not managed in a distributed manner, retrieval of display screens must be performed in each terminal according to the keyword. Therefore, the display screen of terminals in identical distributed database systems cannot be easily retrieved.

Furthermore, since stand-alone terminals are heavily loaded by the data retrieval described above, processing specific to the terminals may not be performed.

SUMMARY OF THE INVENTION

It is accordingly an object of the invention to provide a distributed database system permitting fast retrieval of data registered as a distributed database in a terminal.

It is another object of the invention to provide a distributed database system permitting fast retrieval of display screens registered in a terminal.

The invention also provides a distributed database system for managing data registered in more than one terminal using a specified terminal.

In the invention, a given terminal is defined as a temporary center in a distributed database system. Information used for data retrieval, such as keywords and contents data that can be shared by databases, is registered in a temporary center. A temporary center locates the terminal managing retrieval data. This arrangement reduces the load on each terminal in data retrieval processing.

In the invention, the data retrieval information registered in the temporary center is stored in a keyword link file. The keyword link file contains pairs of keywords of the data and the number of the terminal managing the data or the keywords. Thus, the terminal managing the data can be easily located. Therefore, in any terminal, data can be retrieved quickly because determination of whether retrieval processing can be performed is done quickly.

BRIEF DESCRIPTION OF THE DRAWINGS

FIG. 15A–15F show a retrieval flowchart;

FIG. 17 shows a configuration diagram of a traditional keyword table.

DESCRIPTION OF THE PREFERRED EMBODIMENTS

Figure 1:
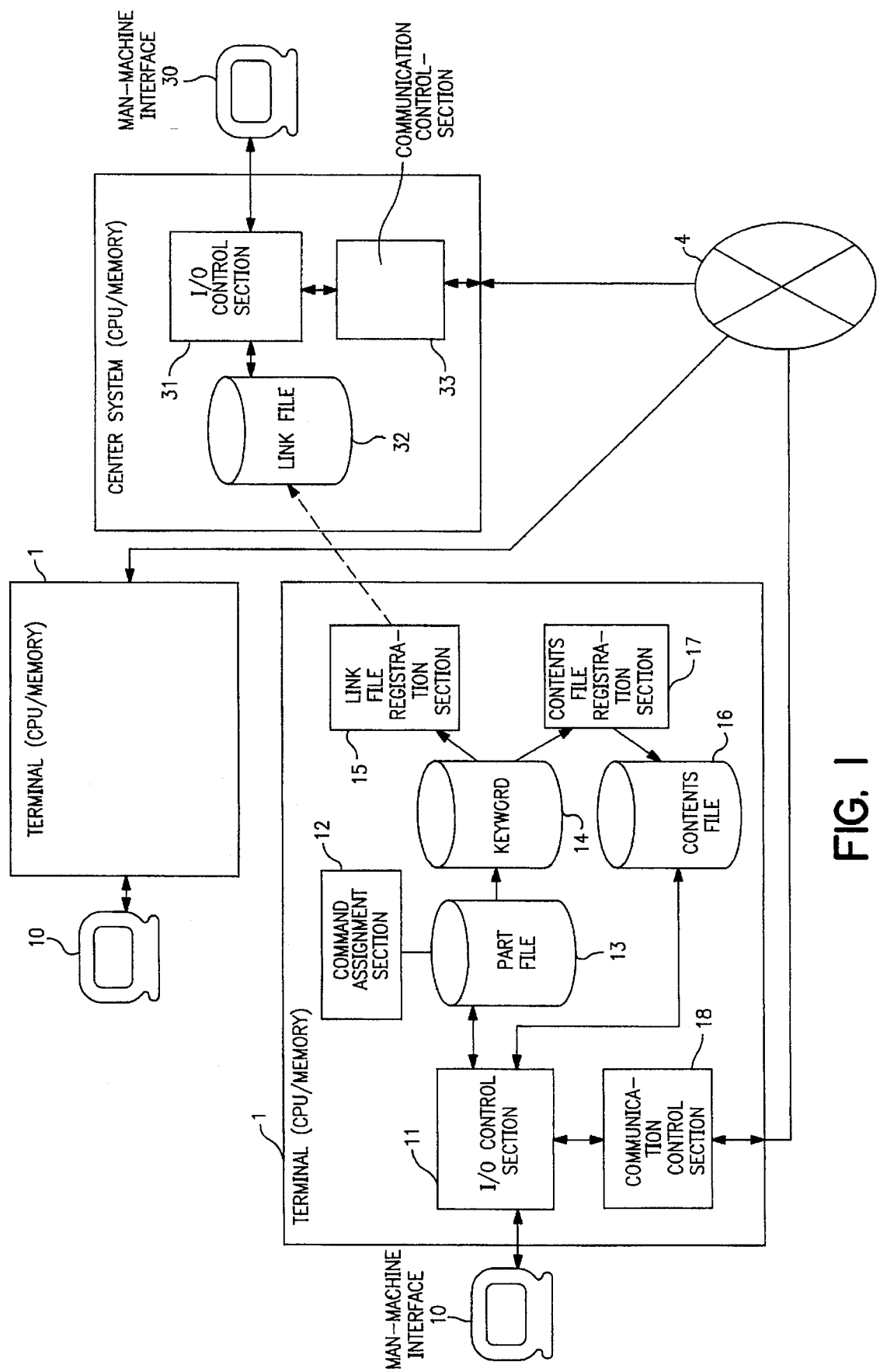
FIG. 1 shows a principle configuration diagram of the invention.

FIG. 1 shows a principle configuration of the distributed database system of the invention, Terminal 1 is used to manage the distributed database data, such as registered display screens. Terminal 3 is defined as a temporary center (hereafter, called a center system) which manages more than one 'terminal 1' for data such as registered display screens.

Man-machine interface 10 serves as an interface for terminal 1, and I/O control section 11 of terminal 1 executes I/O control with the man-machine interface 10. Command assignment section 12 is used to assign commands defining the attributes of display screens. Parts file 13 manages attribute information, such as the commands and keywords assigned to registered display screens. Keyword file 14 is pointed to by parts file 13 and manages one or more keywords set on a display screen by command name. Link file registration section 15 registers keywords for link file 32 of center system 3. Contents file 16 manages command names with assigned keywords. Contents file registration section 17 registers the data of keyword file 14 in contents file 16. Communication control section 18 performs data communication between remote terminal 1 and center system 3.

Man-machine interface 30 serves as an interface of center system 3. I/O control section 31 of center system 3 executes I/O control with the man-machine interface 30. Keyword line file 32 manages, by keyword, the terminal number of terminal 1 in which keywords are registered, and also preferably manages command names associated with the keywords. Communication control section 33 executes data communication with terminal 1 via public network 4.

Upon receipt of a display screen registration request from the man-machine interface 10, the I/O control section 11 registers attribute information. Attribute information includes the name of a display screen to be registered, a command name, and a keyword in part file 13. The command assignment section 12 assigns the command name. The actual data of the keyword associated with the command name is registered in the keyword file 14. When a new command name and keyword are registered in pairs in the keyword file 14, the link file registration section 15 registers that keyword (preferably the command name is also appended) and the terminal number (preferably the command name is also appended) in a pair, in link file 32 of center system. 3. On the other hand, the contents file registration section 17 registers the command name and keyword, in a pair in contents file 16. The terminal number managing a command name can be located by use of the command name.

When a request to retrieve a display screen is made by specifying a keyword at the man-machine interface 10 of terminal 1, the I/O control section 11 retrieves the contents file 16 rather than the keyword file 14. Since contents file 16 manages command names by keyword, the I/O control section 11 can locate a required command name in one access. Thus, the I/O control section 11 finds the name of the display screen associated with the command name located by referring to the parts file 13, and consequently displays the display screen associated with the name on the man-machine interface 10. When contents file 16 manages more than one command name, the name of the display screen corresponding to each command is displayed on the display screen of man-machine interface 10. In this way, the invention allows a suitable command name for display screen to be located in just one access to contents file 16.

When a command name associated with a keyword being requested for retrieval is not found, terminal 1 retrieves link file 32 of center system 3 via the communication control section 18. By retrieving the link file 32, the terminal number managing the keyword being requested is located. Terminal 1 sends the keyword to the terminal of the located terminal number via the communication control section 18. It then executes the retrieval request on the display screen in order to transfer the display screen to be retrieved according to the above procedure. Thus, the proper display screen is displayed. When the link file 32 manages the command name, the display screen to be transferred is retrieved immediately by sending the command name to terminal 1 of the located terminal number. In this way, this invention permits quick retrieval of display screens by locating terminal 1 to perform retrieval processing using center system 3.

Figure 2:
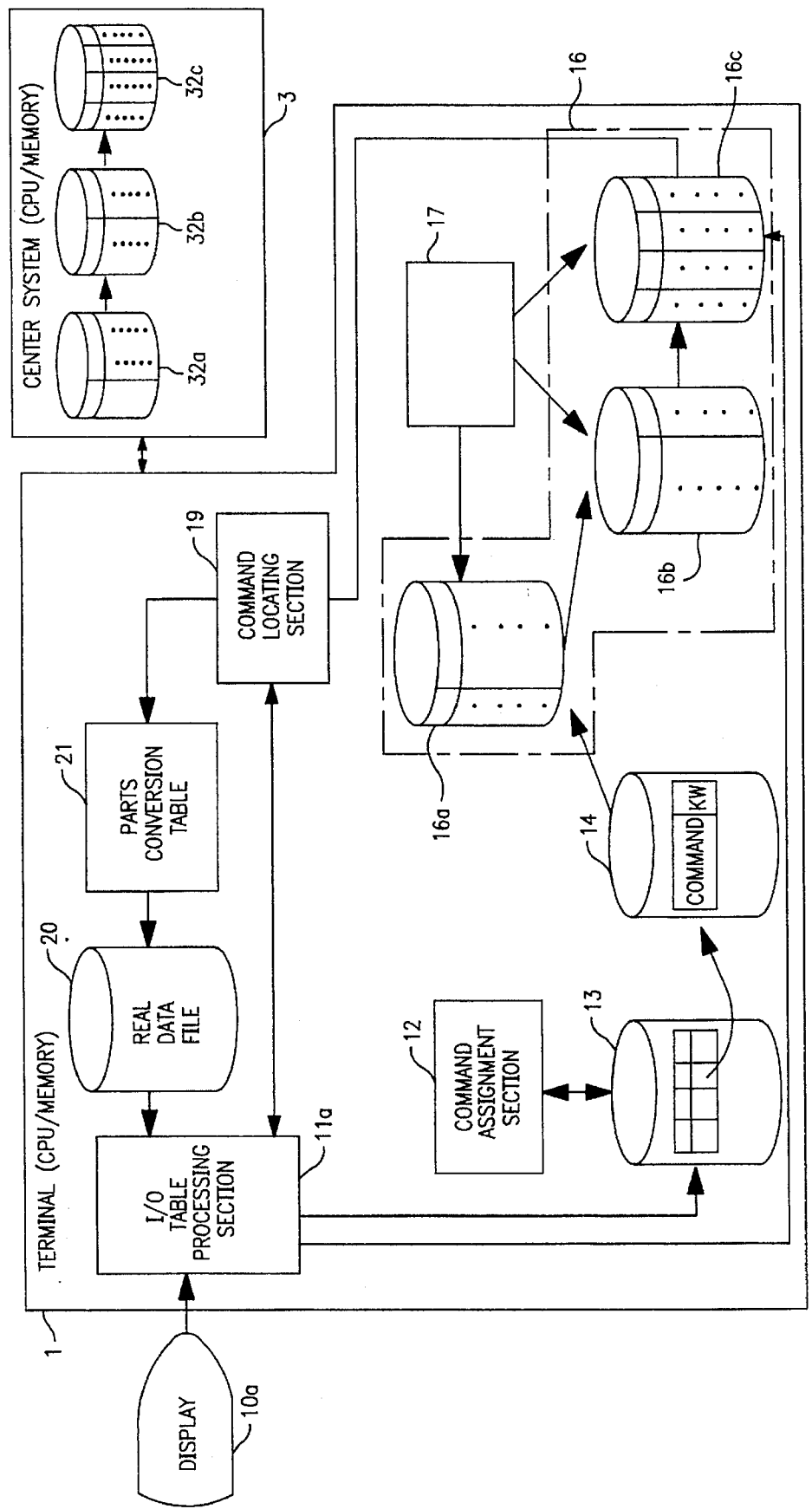
FIG. 2 shows a configuration diagram of an embodiment.

FIG. 2 illustrates a configuration of terminal 1 and the center system to which the invention applies. In FIG. 2, the reference numerals are the same as those in FIG. 1. 10a indicates a display corresponding to the man-machine interface 10. 11a indicates the I/O table processing section corresponding to the I/O control section 11. 19 indicates the command detection section, which locates one or more command names read from the contents file 16 (particularly keyword contents file 16c) through dialog with an operator. 20 indicates a real data file that stores the real part of data (thereinafter called parts) in files having display screens. 21 indicates a parts conversion table. This table manages the correspondence between command names assigned to parts and the storage addresses of the parts in real data file 20.

Contents file 16 consists of three files 16a, 16b, and 16c. The file 16a is a keyword contents index management file that manages keywords in keyword file 14. The file 16b is a keyword contents index file that manages keywords by numbering them in keyword file 14 using the index management file 16a. The file 16c is a keyword contents file that appends link data and match link data using the index file 16b.

A final keyword contents file 16c can be created using keyword file 14. However, the use of the keyword contents index file as described above is preferred. This is so file registration and retrieval can be performed more quickly.

Corresponding to the configuration of contents file 15 described above, the link file of center system 3 also consists of three files, 32a, 32b, and 32c. Keyword link file 32c, keyword link index management file 32a and keyword link index file 32b are provided for management of keyword linking. The structure of files 32a, 32b, and 32c in center system 3 is basically the same as the structure of files 16a, 16b, and 16c in terminal 1. In this configuration, for convenience, the communication control facility between terminal 10's and the center system 3 managing the two terminal 1's are omitted.

Figure 3:
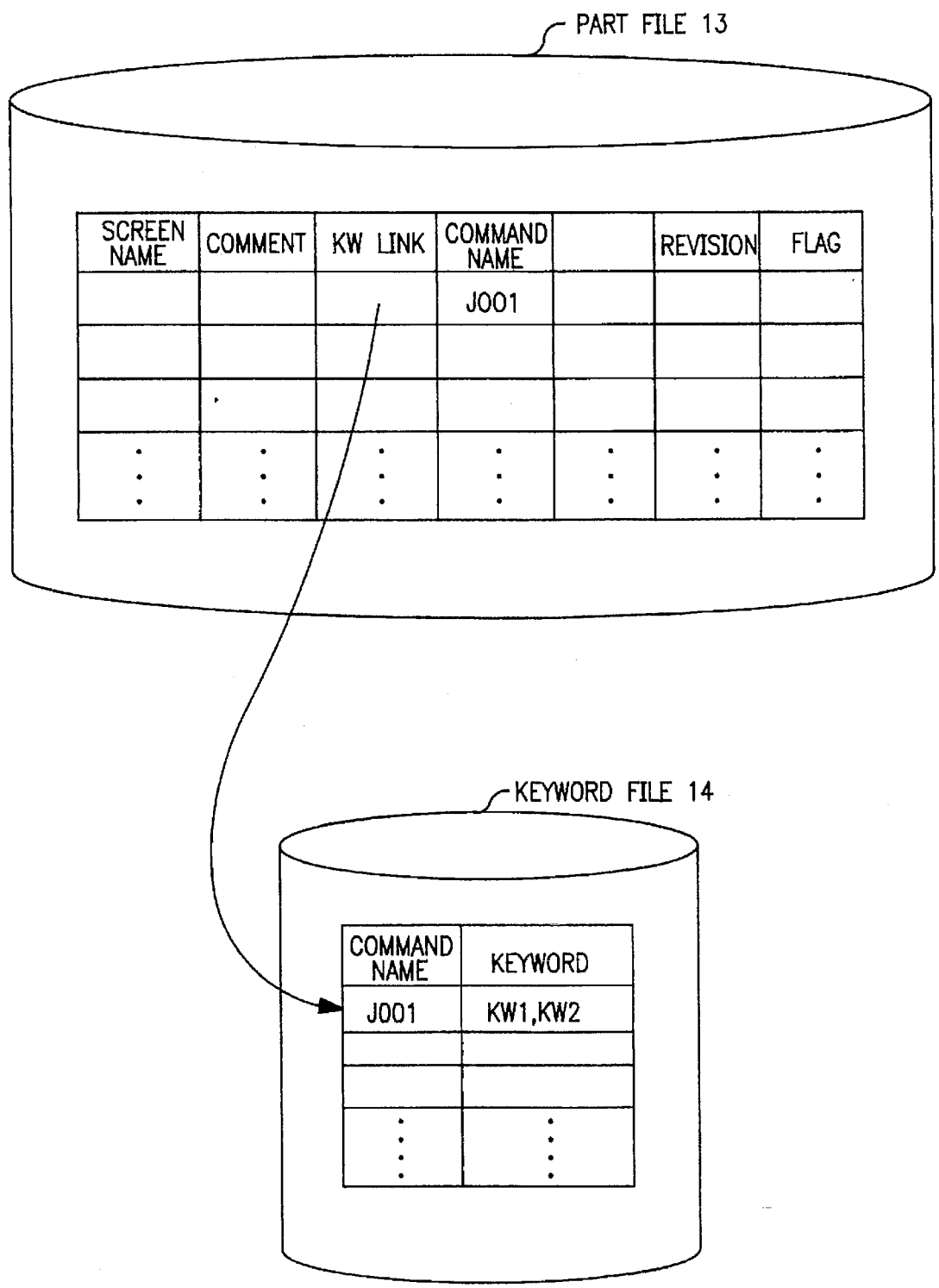
FIG. 3 shows a configuration diagram of the part and keyword files.

FIG. 3 illustrates a detailed system configuration of parts file 13 and keyword file 14. As shown in FIG. 3, parts file 13 is structured to manage attribute information. This includes the display screen name, comments, keyword link (abbreviated as KW link in FIG. 3) command name, revision, and flag. These are all parts registered in real data file 10. The screen name field consists of a screen name of up to 40 characters and the abbreviated name (up to 10 characters) of the screen. The keyword link field points to the position of the command name assigned to the screen name in keyword file 14. The command name assigned to a part (data) describes the behavior (processing) of the part. The revision field indicates how many times the part having the screen name was revised. Therefore, the greater the revision, the newer the parts, or the data. The flag indicates whether the part having the screen name is registered externally. For example, when the flag is zero, the part cannot be referenced except at the terminal. Therefore, information about the part exists in fields within local terminal 1, but does not exist in fields within terminal 3 and remote terminal 1. In other words, the part is not opened. On the other hand, when the flag is one, the part is opened. Therefore, information about the part exists in a predetermined format in files within the local terminal 1, center system 3, and remote terminal 1 as required.

Keyword file 14 is pointed to by keyword link of part file 13. It is structured to manage one or more keywords, KW1, KW2, etc., assigned to a command name of each part.

Figure 4:
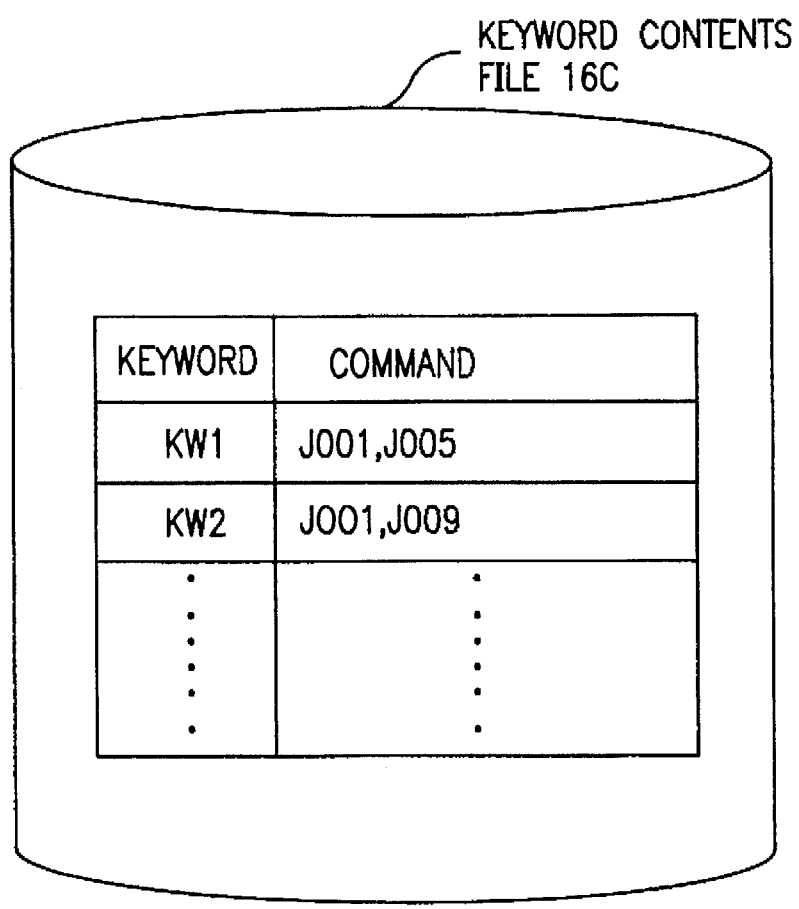
FIG. 4 shows an outline of a keyword contents file.

FIG. 4 illustrates the basic concept of a contents file, one of the features of the invention. Keyword file 14 manages keywords assigned to each command name by command name. Contents file 16 sorts the management contents using keyword contents file 16c and manages by keyword command names to which the keywords are assigned. Contents file 16 created by this sorting is registered (created) by contents file registration section 17.

Figure 5:
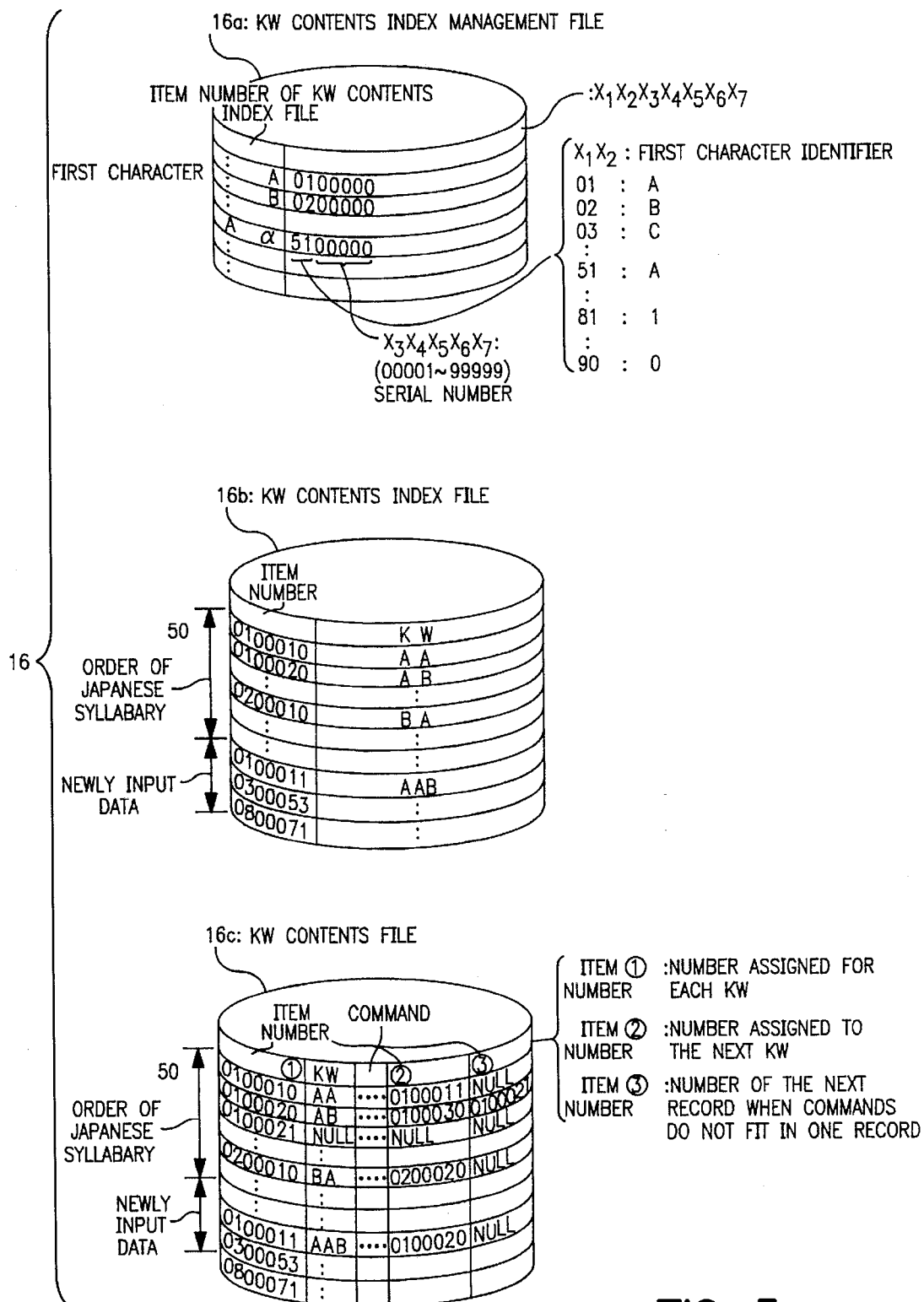
FIG. 5 shows a configuration diagram of a contents file.

FIG. 5 shows details of the three files, 16a, 16b, and 16c constituting contents file 16.

Keyword contents index management file 16a manages the first characters "A", "B", etc. of keywords in keyword file 14 and the start numbers of the first characters.

An item number is a seven digit long number represented by the symbols $X_1$ to $X_7$ in FIG. 5. The first two digits "$X_1 X_2$" of an item number are used as an identifier of the first character of a keyword. For example, "01" indicates "A", "02" indicates "B", and "51" indicates "A". The remaining five digits "$X_3 X_4 X_5 X_6 X_7$" represent values from 00001 to 99999. Unique item numbers are assigned to individual records in contents file 16.

In keyword contents index management file 16a, the start item number of the first character "A" is 0100000. It is used as an identifier.

When a keyword is input, keyword contents index file 16b assigns a more detailed item number based on the item numbers of the first characters registered in keyword contents index management file 16a. This is so that, for example, keywords can be registered in the order of the Japanese or other syllabary. Data newly input after creation of the file 16b is registered at the end of the file. All data registered in the file 16b is sorted in the order of the syllabary during given periods. For example, the item numbers of keywords "AA" and "AB" are defined as "0100010" and "0100020", respectively, and their identifiers are equal. Keyword "AAB" registered later has the item number "0100011", which is between the item numbers of the former two keywords. The result is that the keyword is registered toward the end of file 16b.

Keyword contents file 16c basically manages keywords and command names (hereafter called commands), and item numbers indicated ① to ③. Item number ① assigned to each keyword. It is the management number assigned to the start of a record that is registered in index file 16b. Item number ② is used to determine which keyword follows a given keyword (record) by referring to index file 16b. It is required because the keyword contents file 16c is sorted every given period (as with index file 16b) so that the data is, for example, placed in the order of the syllabary. Item number ③ is used to link records for commands that do not fit in one record. Consider the example of keyword "AA." First, an associated command is stored. As item number ①, the actual item number "0100010" is stored. As item number ②, the item number "0100011" of the following keyword "AAB" is stored. By doing this, when keyword "AAB" is newly input, the keywords can be retrieved in the order of the Japanese or other syllabary regardless of their physical position in the file. If item number ③ is "Null", there is no record following keyword "AA." ON the other hand, "100021" is stored as the item number ③ of keyword "AB." In the item number "0100021", the command associated with the keyword "AB" that cannot fit in the record of item number "0100020" is stored. Therefore, the keyword "AB" has two item numbers 1's.

By providing contents file 16, particularly keyword contents file 16c (which is retrieved using a keyword) terminal 1 can quickly retrieve a required display screen from the list of registered display screens.

Quick retrieval can also be performed because the keyword contents index management file 16a managing first characters and the item numbers associated with them is provided. Additionally, the keyword contents index file 16b managing keywords by item numbers in the file 16a is provided.

Furthermore, keyword contents file 16c sorted in desired character sequence can be created by management file 16a and contents index file 16b. This permits quick retrieval in character sequence. In addition, keyword contents file 16c is registered in a desired character sequence using keyword contents index management file 16a and keyword contents index file 16b. Therefore, retrieval in that character sequence can be easily performed.

Item numbers paired with keywords are temporarily prepared in keyword contents index file 16b before creating keyword contents file 16c. This makes creation of the keyword contents file simpler.

Figure 6:
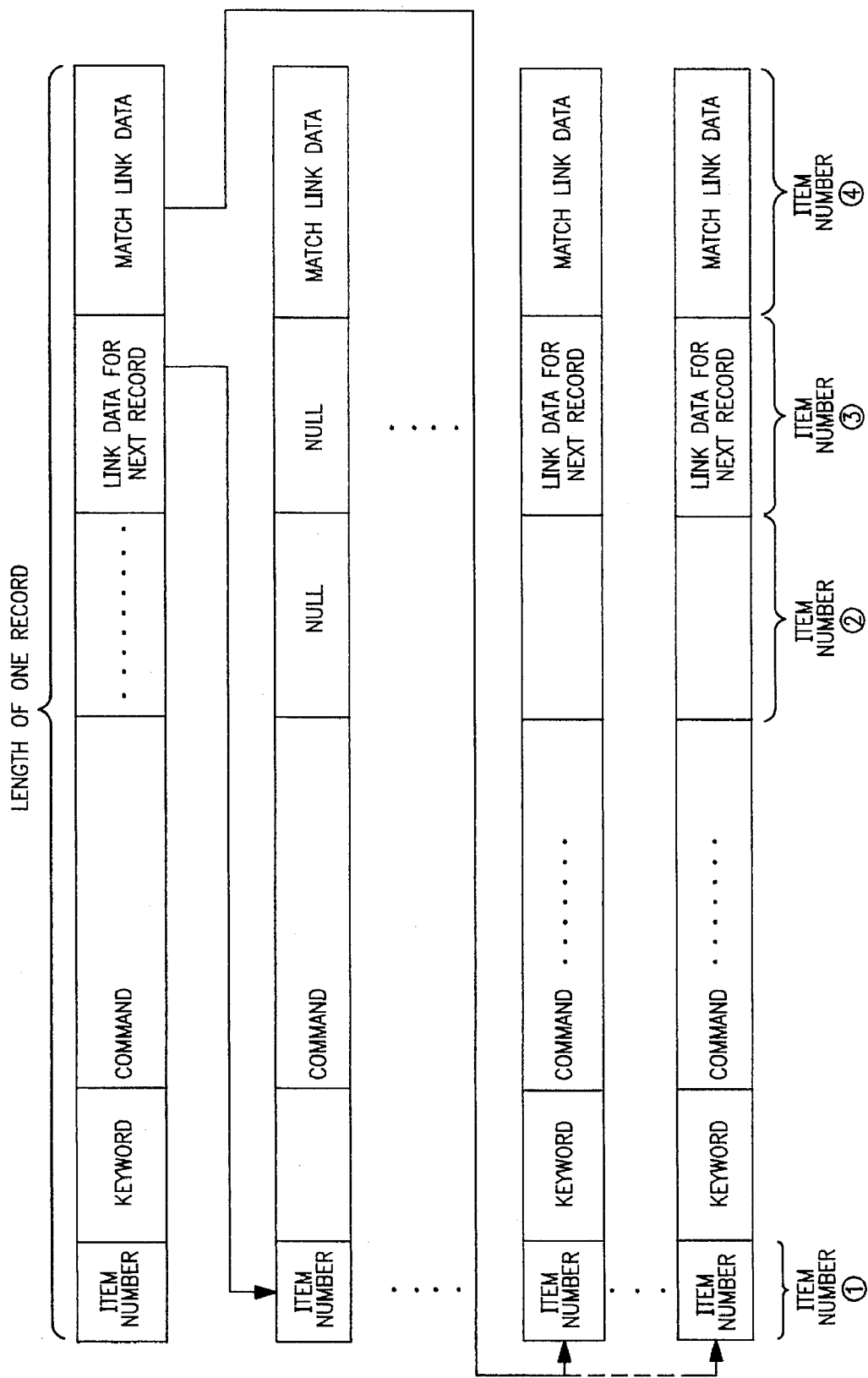
FIG. 6 shows the relationships between records.

FIG. 6 shows the relationship among records in keyword contents file 16c.

In keyword contents file 16c, the size of one record is, of fixed-length. An item number (item number ①) uniquely determined for each record is appended at the start of each record. One record, in principle, corresponds to one keyword. Therefore, because of fixed-length records no more than a predetermined number of commands can be registered. If the number of commands exceeds the predetermined number, the extra commands are discarded and not saved. If retrieval is attempted the desired command may not be displayed. To handle this situation, when the number of commands for keywords registered exceeds the limit (a predetermined number) of a record, keyword contents file 16c manages data for linking with the next record as item number ③. When terminal 1 specifies a keyword, not only command names associated with the keyword but also command names associated with other keywords linked by the link data are located. By doing this, additional commands for each keyword are not discarded and a display screen can be made to accommodate nay number of commands. The link described above can be performed among records so long as the file capacity is permitted.

In the top record (first record) in FIG. 6 (item "Link data of the next record") item number ③ points to item number ②, in the second record. By doing this, the keyword in the first record can store commands corresponding to the second record. The keyword field, item number ② and item number ③ in the second record are null, since the second record follows the first record. However, when a command must also be registered for the keyword in the first record, item number ③ in the second record is changed to point to item ① in the record to be linked. In this way, as many records as are required can be linked.

As shown in FIG. 6, at the end of each record, match link data associated with the keyword or item number ① is stored as item number ④.

The relation of one keyword with another is stored by the item number (item number ①) as match link data. In other words, when keywords similar to a specified keyword exist, a file must be retrieved for each of the similar keywords and the possibility exists that a command name may not be located quickly. For this reason, keyword contents file 16 manages match link data to indicate a match between keywords by item number. When terminal 1 specifies a keyword, not only the command names associated with the keyword but also the command names associated with other keywords linked by match link data are located. Hence, specifying a keyword in terminal 1 is equivalent to specifying other related keywords at the same time. This is so that more command names can be located at one.

Item "Match link data" ([or] item number ④) in the first record in FIG. 6 points to item number ① in the third record and fourth record in FIG. 6. Therefore, each record can have more than one item number as item number ④. The third record and fourth record are different from the second record in that they are normal independent records. When the first record is specified by the keyword, not only the commands in the first record but also commands in the linked third and fourth records can be located at the same time. At this time, commands in the second record are also located.

Figure 7:
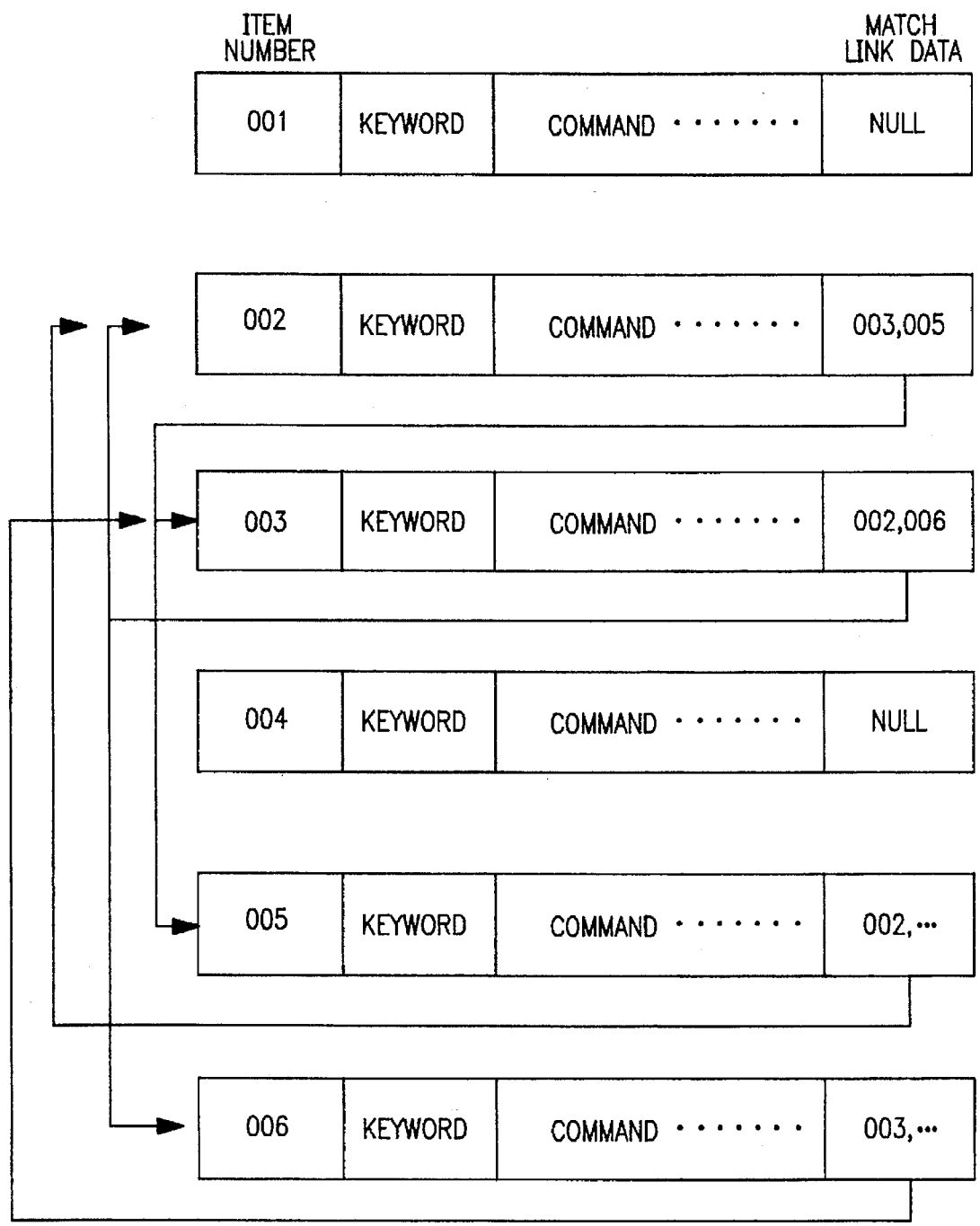
FIG. 7 shows an example of match link data.

FIG. 7 shows an example of match link data. For convenience, assume that item numbers are from 001 to 006. Since the keyword of item number 1 has no similar keywords, the match link data field is null. The keyword of item number 002 has 003 and 005 as match link data. The keyword of item number 003 has 006 and 002 as match link data. The keyword of item number 005 has 002, etc. as match link data. The keyword of item number 006 has 003, etc. as match link data. Under these conditions, when the keyword of item number 002 is specified, in addition to the commands of item number 002, commands of item numbers 003, 005, 006, etc. are located.

One way of avoiding an infinite chain caused by match link data is to consider the relationship of depth to locating commands. When the keyword of item number 002 is specified, only item numbers 003 and 005 indicated directly by match link data can be located. Or, item numbers 003 and 005 directly linked to item number 006 can be located.

This invention features a configuration in which center system 3 is provided with link file 32, as shown in FIG. 1. As shown in FIG. 2, link file 32 consists of three files 32a, 32b, and 32c. The files 32a, 32b, and 32c correspond respectively to files 16a, 16b, and 16c in terminal 1. Therefore, the files 32a, 32b, and 32c have the same structure as the files 16a, 16b, and 16c previously described.

By providing center system 3 with keyword link index management file 32a and keyword link index file 32b, in addition to keyword link file 32c, retrieval by keyword in the center system can be sped up.

Keyword link file 32c also manages link data. Therefore, when a keyword is specified for center system 3 in terminal 1, not only the terminal number and command name associated with the keyword but also other command names linked by link data can be located. The other commands denote those registered exceeding the value limit of one record. When no associated command name is found in terminal 1, link data is received from center system 3. Then the terminal 1 getting the link data can locate a desired command. The command name is gotten from the command names associated with the keyword of the linked item number, or the terminal 1 of the terminal number associated with the keyword.

Keyword link file 32c also manages match link data. Therefore, when a keyword is specified for a center system in a terminal, not only the terminal number and command name associated with the keyword but also the terminal numbers and command names associated with other keywords linked by match link data can be located. When no associated command name is found in terminal 1, a command name can be located by match link data in center system 3. Or a desired command name can be located in the terminal 1 by receiving match link data from center system 3.

Link file 32 is similar to an integration of contents files of more than one terminal 1. Therefore, link file 32 in center system 3 may reach a considerable size. Link file 32 in the center system will consequently take a relatively long time to retrieve.

Figure 8A:
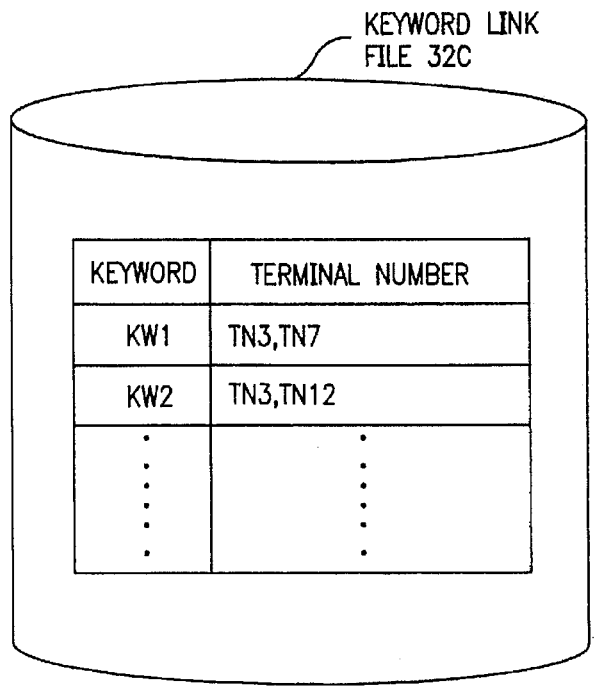
FIG. 8A and 8B show an outline of a keyword link file.

Accordingly, keyword link file 32 is structured as shown in FIG. 8A. FIG. 8A is shown in contrast to FIG. 4 in order to outline the basic structural concept behind keyword link file 32c. Keyword link file 32c has information for locating terminal 1—in which keywords are registered—by keyword. The information is structured to manage the terminal number (TN) of a given terminal 1 rather than command names. Actual keyword link file 32c has the same structure as keyword contents file 16c shown in FIG. 5. Terminal numbers, instead of command names, are stored in keyword link file 32c. Because terminal numbers are shorter than command names, the file size can be reduced.

Figure 8B:
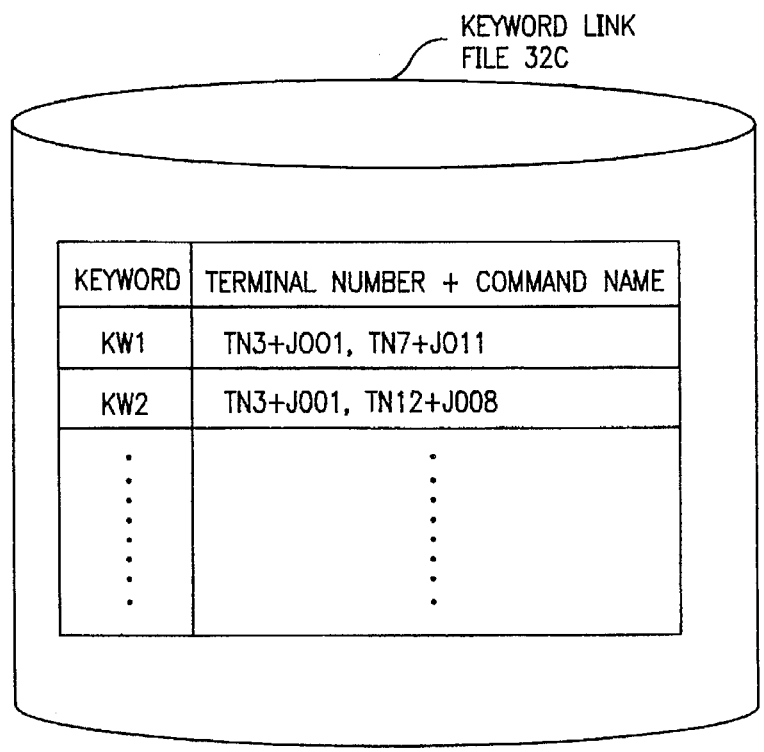
Figure 9:
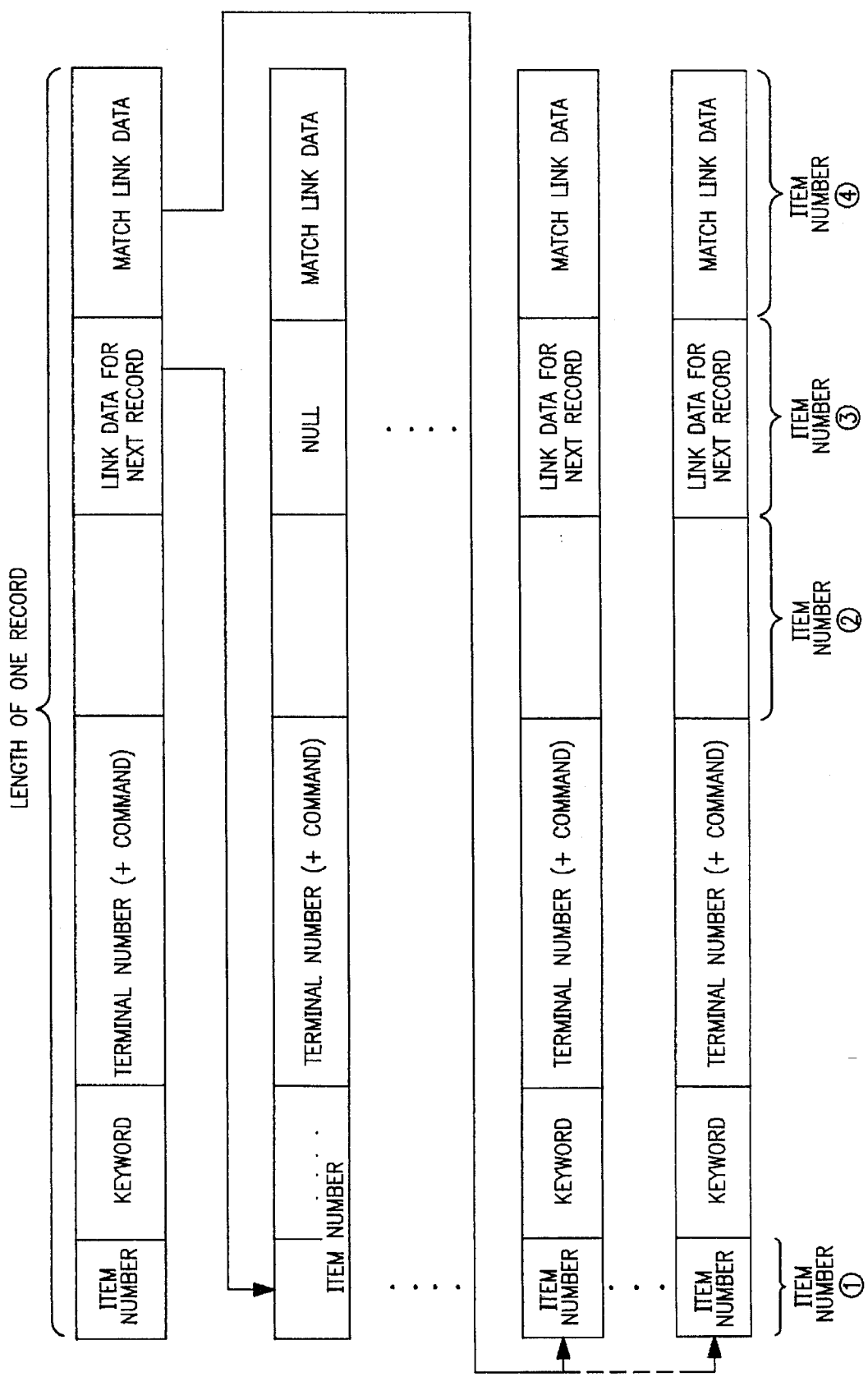
FIG. 9 shows the relationships between records.

Under different conditions, namely when file capacity in center system 3 is sufficient, keyword link file 32c can be structured as shown in FIG. 8B. FIG. 8B is also shown in contrast to FIG. 4. The keyword link file 32c is structured to manage not only terminal numbers but also command names associated with keywords. FIG. 9 shows the relationship among records in keyword link file 32c. FIG. 9 corresponds to FIG. 6. When a retrieval request is issued from terminal 1, center system 3 notifies the terminal 1 of the terminal 1 terminal number managing the command associated with the keyword. The terminal number must usually be extracted from the command. Accordingly, when a command is received as a result of retrieval, extraction processing is required. However, the file structure in FIG. 8B eliminates extraction processing when a terminal number is received as a result of retrieval in order to speed up retrieval.

Center system 3 has link file 32. Conversely, it may be said that terminal 1 having link file 32 is a temporary center or a center system 3. From this standpoint, center system 3 is only slightly different from remote terminal 1's. Center system 3 is only different in that it keeps a link file 32 for each item such as a display screen, found in a distributed database.

Figure 10:
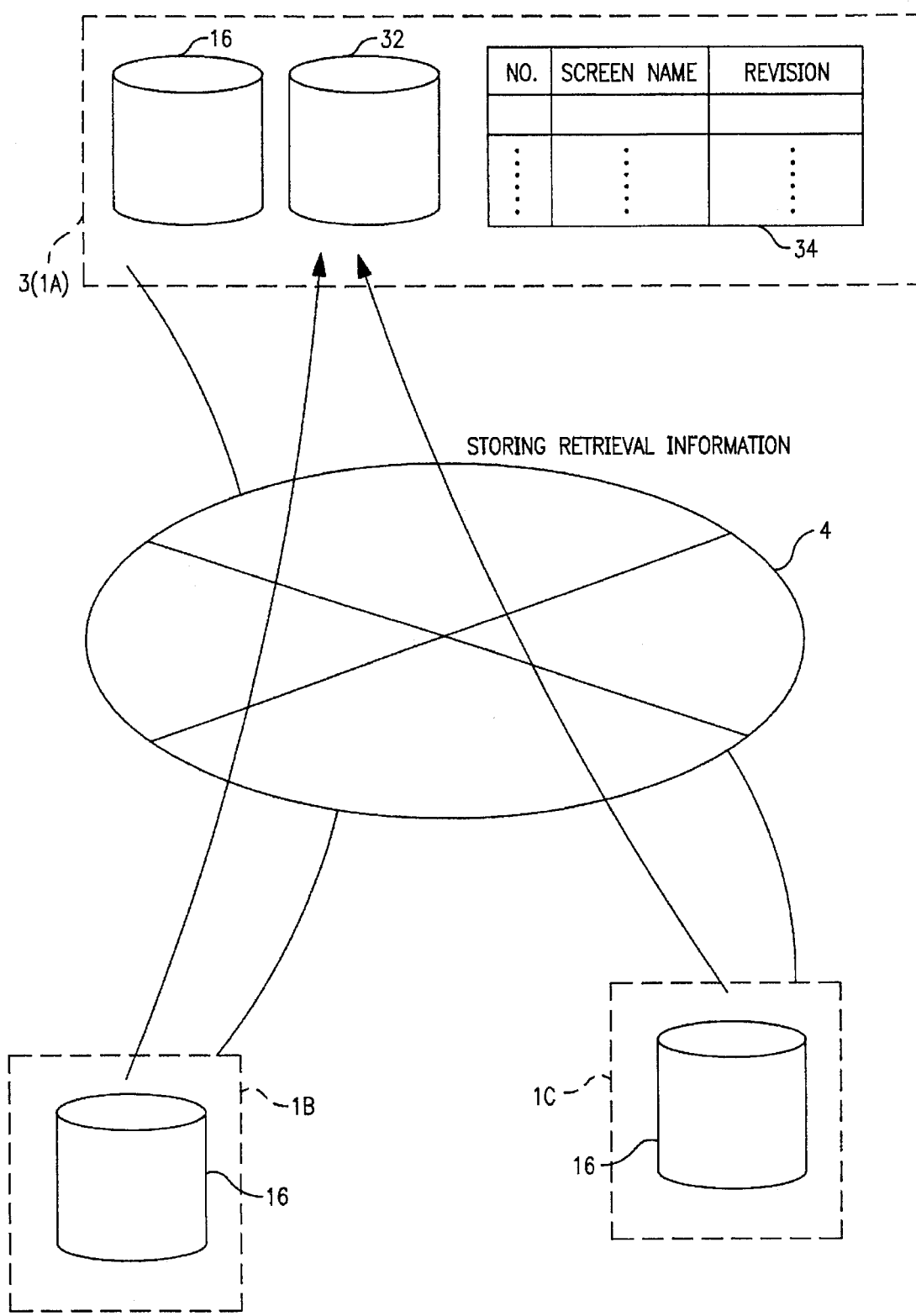
FIG. 10 shows a configuration diagram of a center system.

FIG. 10 outlines creation of link file 32, that is, the set up of center system 3. For example, terminal 1A is declared a temporary center (center system 3) and notifies remote terminals 1B and 1C of this fact via public network 4. Terminals 1B and 1C send retrieval data to terminal 1A via public network 4. This retrieval data includes data contents and keywords in local databases that can be shared (externally registered). Terminal 1A receives the retrieval information and stores it in a local file. Terminals 1B and 1C send the contents of their own parts file 13 so they can be registered externally. In other words, parts that can be flagged as 1 are sent. Terminal 1A creates a link file 32 based on received information. Terminal 1A also uses the contents of its own parts file 13 so that it can be registered externally in order to create link file 32. Therefore, link file 32 is an integration of the data of contents file 16's of terminals 1A to 1C that can be registered externally. Terminal 1A has link file 32, in addition to its own contents file 16. The possession of the link file 32 makes terminal 1A a center system 3.

In addition, terminal 1A creates data contents 34 in the same way as with link file 32. Data contents 34 has a structure similar to parts file 13 and contains a list of parts (data) that can be registered externally. In FIG. 10, data contents 34 contains only the screen name field and revision field, for convenience.

In this way, all retrieval information on shared data in databases in terminals 1A to 1C, as well as associated terminal numbers (actually commands), are stored and managed centrally in center system 3. When a data retrieval request occurs in a terminal, for example, terminal 1B, an inquiry about retrieval information is made to center system 3 to locate terminal 1C managing desired data. Then, terminal 1B directly accesses terminal 1C to obtain the desired data.

Excluding center system 3, terminals 1B and 1C do not manage the contents of shared data throughout the entire distributed database. Therefore, normally, terminal 1B or 1C alone would not be able to locate a terminal number managing desired data. However, this is possible using the proposed system. When terminal 1B or 1C references contents of shared data, a request is issued to center system 3. The contents (part of link file 32) are then received from center system 3. Then the terminal number managing desired data is located through reference to the contents. When a keyword is used, it is sent to center system 3 which checks for existence or absence of the specified keyword. If it is found, the registered terminal number along with the keyword are sent to the terminal.

Figure 11:
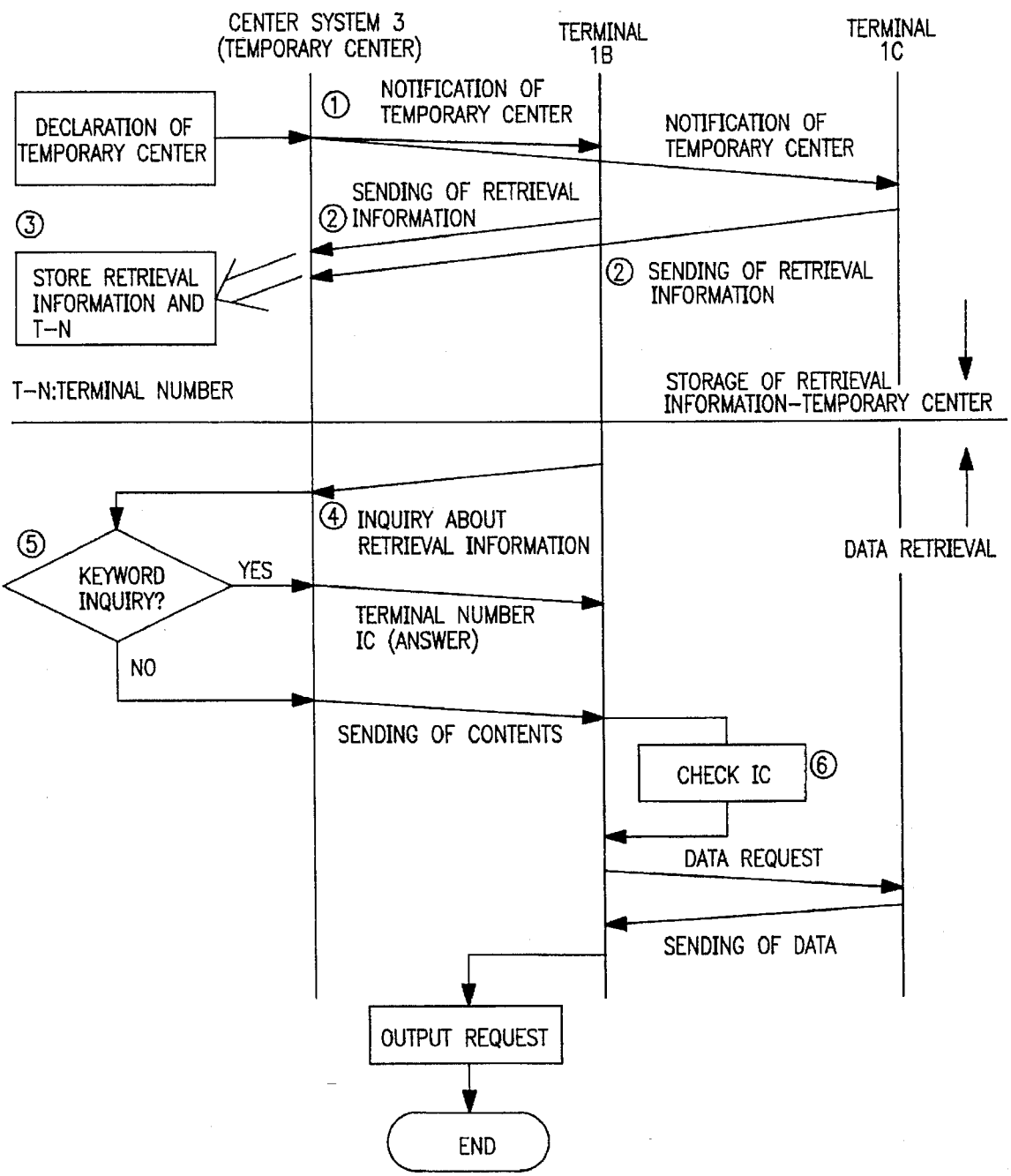
FIG. 11 shows the communication between a center system and terminals.

FIG. 11 shows communication between center system 3 and terminal 1, described in the following sequence.

① Terminal 1A notifies remote terminals 1B and 1C that it is a temporary center (center system 3).

② Upon notification, terminals 1B and 1C each send retrieval information, such as keywords and contents on shared data in their own databases, to center system 3.

③ Center system 3 stores received retrieval information in its own link file 32. This, way, retrieval information on shared data in the distributed database system is managed centrally in center system 3.

④ Terminal 1B in which a data retrieval request occurs requests retrieval information from center system 3.

⑤ Center system 3 performs processing according to the inquiry contents. Namely, for an inquiry by keyword, center system 3 locates the keyword in the registered data and sends the associated terminal number to the inquiring terminal 1B. When the specified keyword cannot be located, a message is returned indicating that the keyword was not found.

When an inquiry is not made by keyword, center system 3 sends the contents information to the inquiring terminal 1B. Terminal 1B references the contents information and locates the terminal managing the desired data.

⑥ In this way, terminal 1B confirms that terminal 1C was located, requests it to send data, then receives and displays the data.

As shown above, retrieval information is managed centrally in a center system 3 consisting of one terminal 1. Retrieval information consists of such information as keywords and contents for retrieving shared databases in a distributed database system. Therefore, excluding system 3 terminals 1B and 1C need only have the function to communicate with remote terminals 1C and 1B via public network 4. Terminals 1B and 1C are not heavily loaded for data retrieval. Excluding center system 3, terminals 1B and 1C can be configured using just a workstation or personal computer.

Since center system 3 contains revision information in data contents 34 as shown in FIG. 10, the identity of data (parts) in terminals 1A to 1C can be maintained. In other words, although data can be created and updated only in the creating terminal, when (opened) data that can be registered externally is updated, data mismatch may occur in terminals 1A to 1C. To avoid this, the data updating must notify terminals 1A to 1C of data alternation, which is quite difficult. By managing the revision field in data contents 34 in center system 3, terminals 1B and 1C can check whether the data is up-to-date when retrieving data.

Figure 12:
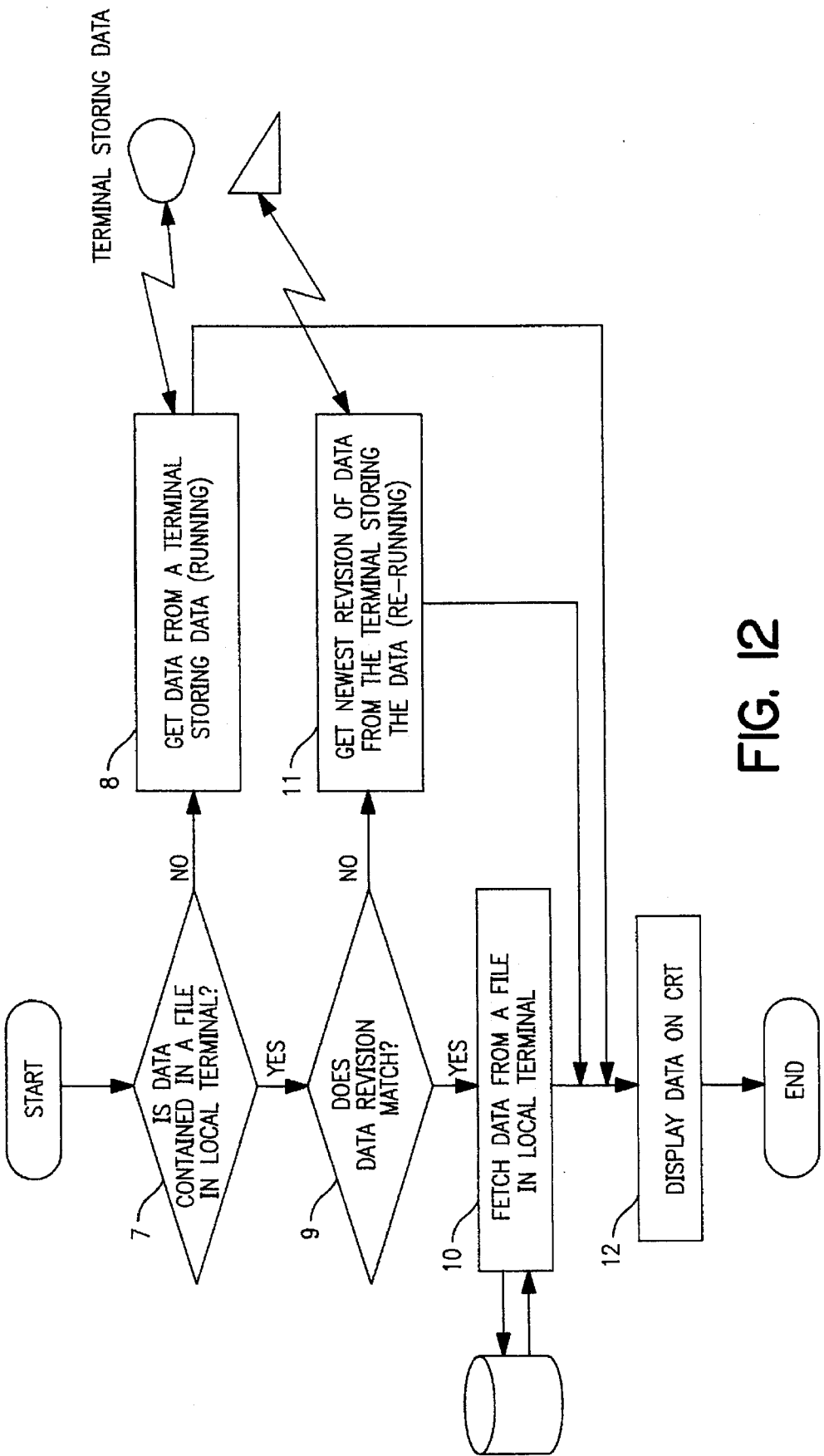
FIG. 12 shows a data revision check flowchart.

FIG. 12 shows the flow of data revision checking.

⑦ To reference data created in remote terminal 1C, terminal 1B issues a request to center system 3 and receives the command. Using the command, terminal 1B retrieves a database in local terminal 1B. That is, terminal 1B checks whether desired data is contained in a file in local terminal 1B.

⑧ Since the creator of desired data is remote terminal 1C, desired data does not exist in local terminal 1B. Terminal 1B finds out from center system 3 that the creator was terminal 1C and can then get the desired data from terminal 1C (running of data). Obtained data is displayed on the CRT of terminal 1B in subsequent processing.

⑨ When desired data was obtained as in process ⑧ or any other similar process, the data exists in local terminal 1B. Terminal 1B references the revision field of data contents 34 in center system 3 and gets the most recent revision of the data. Terminal 1B compares the revision of its own data with the revision received from center system 3.

The revision of its own data can be obtained from the parts file 13 on that data. Therefore, the revision is the same as it was when the data was obtained. Each time data is altered, data alternation notification is made from the creating terminal 1C to center system 3. This notification, for example, consists of a data name (e.g., screen name) and most recent revision. Therefore, the revision in data contents 34 in center system 3 is always up-to-date. Due to this, when data is altered after terminal 1B performs data running, the revision of its own data is different from that obtained from center system 3 (data revision mismatch).

(10) When there is no mismatch, terminal 1B fetches data from its own file. This data is already known to be up-to-date, because the revision information matches. This data is displayed on the CRT of terminal 1B in subsequent processing.

(11) When the data revision does not match, terminal 1B finds out from center system 3 that the creator is terminal 1C as shown in FIG. 11. It then gets the most recent revision of desired data from terminal 1C (re-running of data). The re-run data is displayed on the CRT of terminal 1b in subsequent processing (12).

(12) The most recent revision of data to be referenced is displayed on the CRT of terminal 1B.

In this way, the invention provides the capability to retrieve and reference the most recent data after data alteration for any terminal 1A to 1C. Users can reference the most recent data without worrying about the possibility of data mismatch due to data alteration.

FIGS. 13A, 13B, 13C, 13D, 13E and 13F illustrate registration of parts in this invention.

Figure 13A:
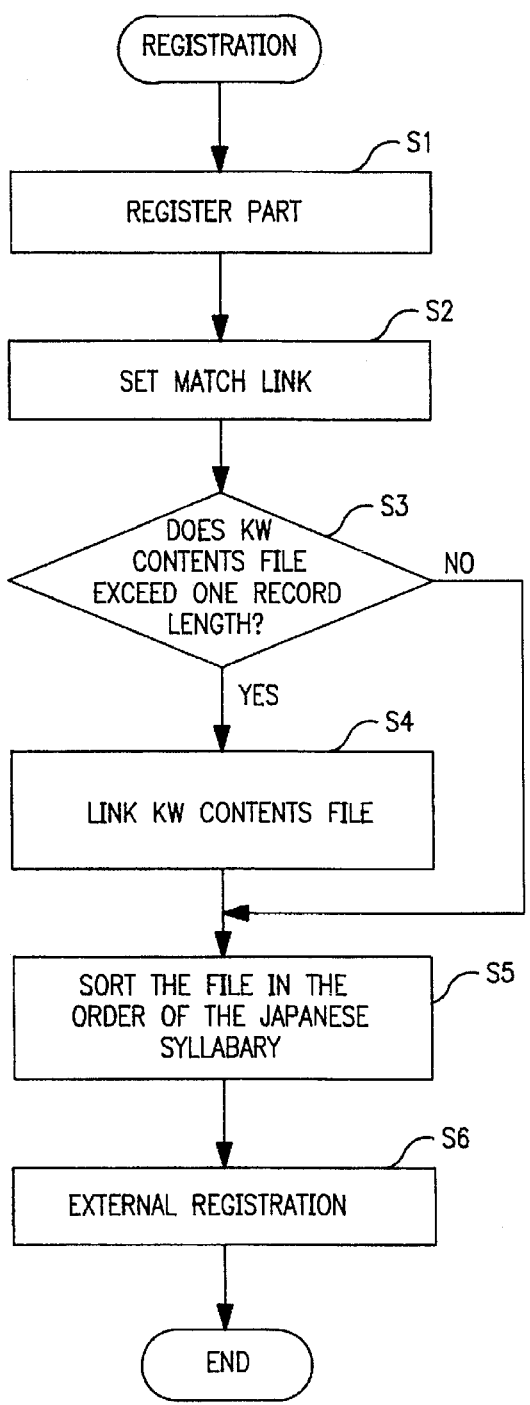
FIG. 13A–13F show a registration flowchart.

FIG. 13A shows a general flowchart of parts registration.

In terminal 1, real data (e.g., screen) is created and registered as a part (step S1). This process is explained later referring to FIG. 13B.

Match link data is set for the registered part (step S2). This process is shown in FIG. 13C.

A check is made to determine whether the record on that part in keyword contents file 16c exceeds one-record (fixed) length (step S3).

If the length is exceeded, link data for the next record is set (step S4). This process is shown in FIG. 13D. If the length is not exceeded, step S4 is not executed.

The keywords are sorted in a specified order as, for example, in the case of the Japanese syllabary (step S5). This process is shown in FIG. 13E.

The parts that can be registered externally are specified and registered in center system 3 (step S6). This process is shown in FIG. 13F.

Figure 13B:
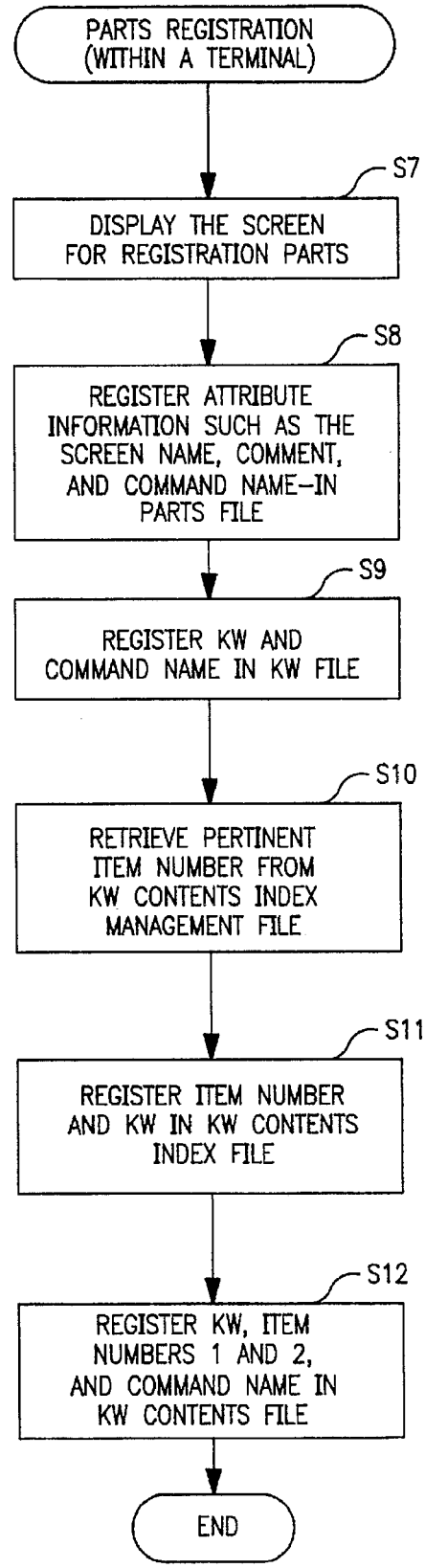
Figures 13C, 13D:
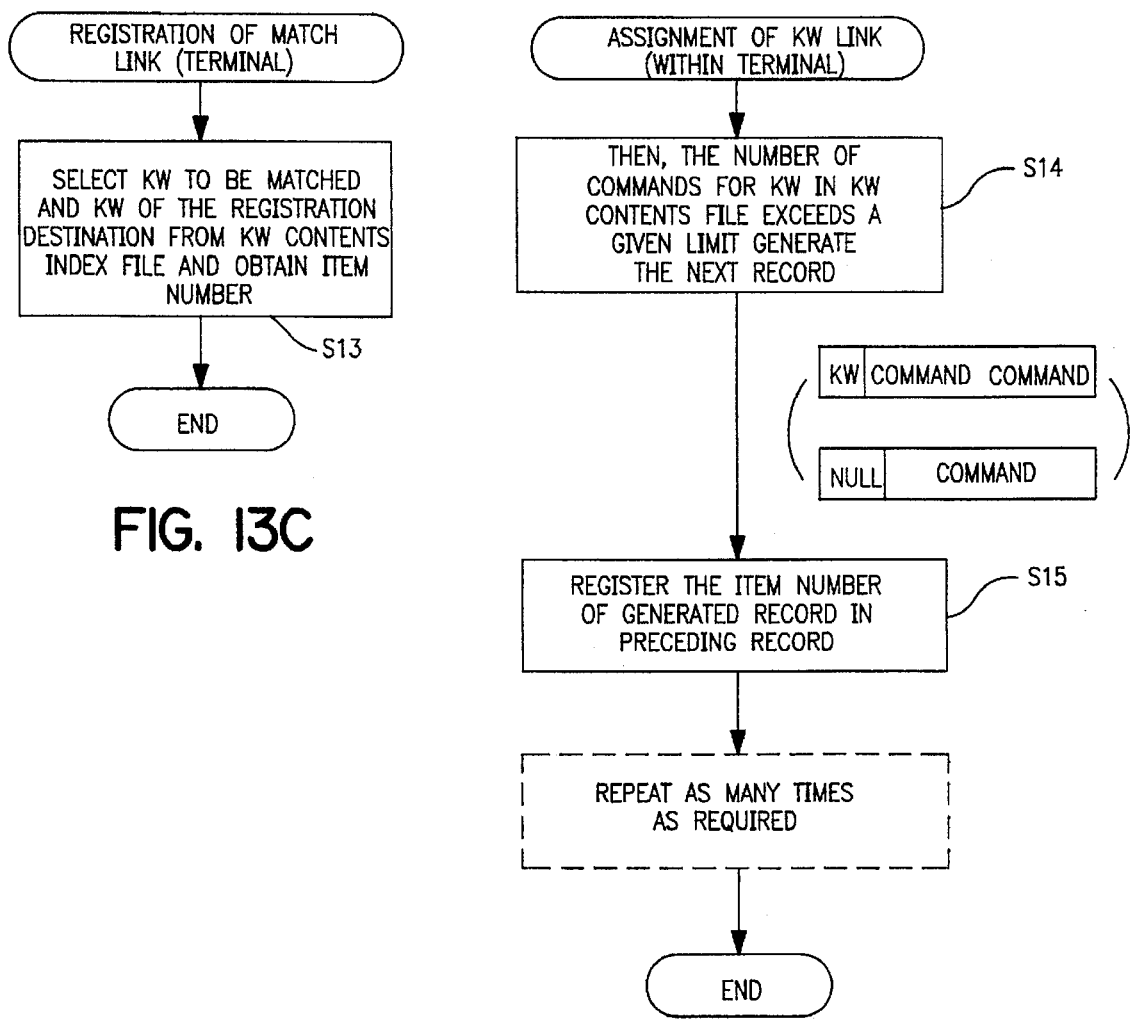
Figure 13E:
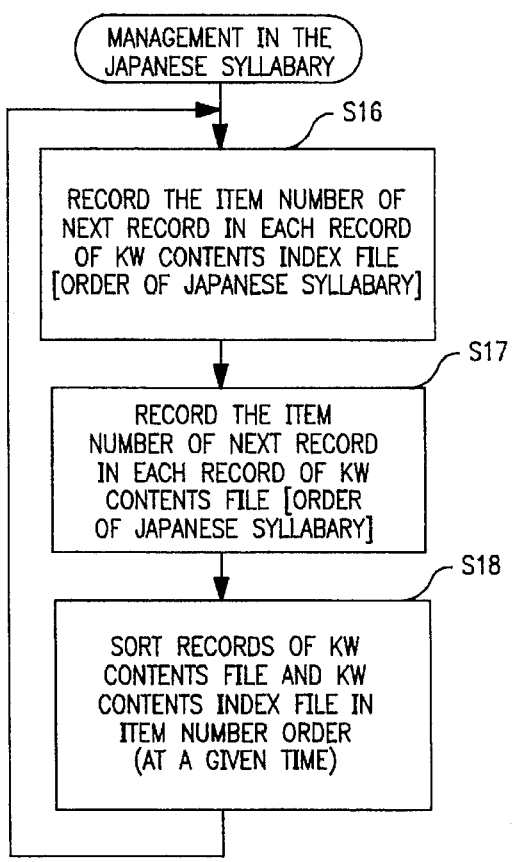
Figure 13F:
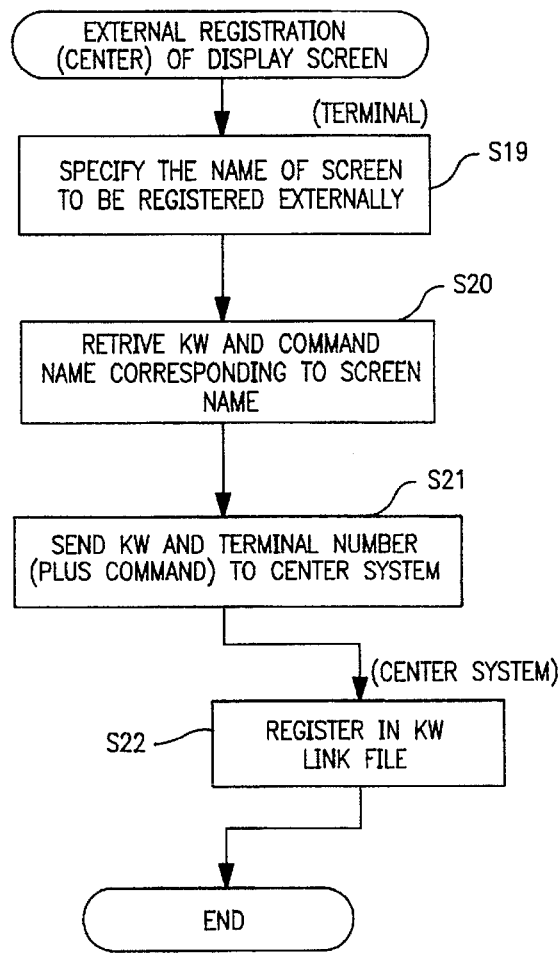

FIG. 13B shows the parts registration process which displays the registration screen and stores data in parts file 13 and contents file 16.

When the real data of a part is stored in real data file 20, terminal 1 displays the screen used for registering the part in display 10a (step S7).

Next, through interaction with the operator using the registration screen, terminal 1 stores the attribute information in parts file 13. This includes information such as the screen name of a part, comments, the command name (command determined depending on which part is being identified), and revision (step S8). Command assignment section 12 assigns commands unique to the system. The revision is 1 due to new registration.

Through the previous interaction, terminal 1 associates one or more keywords assigned with the part to be registered and the command name. It then registers them in keyword file 14 (step S9).

In this way, keyword file 14 is created. Terminal 1 retrieves keyword contents index management file 16a (FIG. 5). This is done to obtain the item number of first character to be associated with each keyword in file 14 (step S10).

As shown in FIG. 5, contents file registration section 17 assigns a further detailed item number associated with the keyword based on the item number. It then registers the item number in keyword contents index file 16b (S11).

From keyword contents index file 16b and keyword file 14, contents file registration section 17, as shown in FIG. 5, does the following: register item number ① assigned to each keyword and item number ② assigned to the next keyword, then create keyword contents file 16c (step S12).

FIG. 13C shows the match link setting which selects a matched keyword and registers it in keyword contents file 16c.

In the following manner keywords (e.g., elementary school pupil and junior high school pupil) to be matched and the registration destination keyword (e.g., student) are selected. An operator selects the keywords on the screen from keyword contents index file 16b registered in step S4. At this time their item numbers are specified. Consequently, match link data is added to keyword contents file 16c as shown in FIG. 6 and FIG. 7, and the item number of keyword to be matched is registered (step S13). This registration is performed by contents file registration section 17.

FIG. 13D shows the setting of record link data. When there are too many commands associated with a keyword to fit in one record, the commands are registered in the next record.

When there are too many commands to fit in one record, contents file registration section 17 generates the next record when assigning item number ③. In addition, contents file registration section 17 generates an alarm to notify the operator that there are too many commands to fit in one record (step S14).

Contents file registration section 17 registers the item number (item number ①) of the generated record in the preceding record as item number ③ (step S15).

When there are too many commands to fit in the generated record, steps S14 and S15 are repeated until all commands can be registered.

FIG. 13E illustrates file sorting, which sorts keywords newly registered in keyword contents file 16c and keyword contents index file 16b.

The item number of the next record (for instance in the order of the Japanese syllabary) is registered in each record in keyword contents file 16b (step S16).

The item number of the next record (in the same syllabary order) is registered as item number ② in each record in keyword contents file 16c (step S17).

Records in files 16b and 16c created this way are sorted by item number at a specified period (step S18). By doing this, contents index file 16b and keyword contents file 16c are created in syllabary order. This processing is performed by contents file registration section 17.

FIG. 13F shows external registration processing, which specifies the part (screen name) permitting external registration. It also sends the keyword and command corresponding to it in center system 3.

When data stored in keyword contents file 16c is stored in center system 3, link file registration section 15 displays the registration screen for external registration in display 10a. Through interaction with an operator, it accepts specification of the part (e.g., screen name) registered in center system 3 (step S19). This sets the flag of parts file 13 corresponding to the screen name to '1'.

Next, by retrieving parts file 13, link file registration section 15 retrieves the keyword and command name assigned to the specified screen name (step S20).

At this time, link file registration section 15 adds the retrieved keyword command name, and terminal number of the local station. It then sends that information to center system 3 (step S21).

Upon receipt of the data, center system 3 checks whether the keyword with the registration request is registered in keyword link file 32c. If the keyword is registered, center system 3 registers the command name of terminal 1 requesting entry registration of the keyword. Namely, it registers the command in addition to the existing record. If not registered, center system 3 registers the keyword with the registration request and the command name in keyword link file 32. In this way, registration to center system 3 is performed (step S22).

Link data and th item number are not sent to center system 3. This is because only parts needing external registration in each terminal 1 are to be linked in center system 3. Therefore, center system 3 adds link data in the same way as at terminals, based on registered keyword link file 32c. In this case, in keyword link file 32C an item number, a command, at its link data can be registered for each keyword. However, in addition to the command, a terminal number can also be registered so that it can be obtained directly from center system 3.

By registering a terminal number in addition to a command as shown in FIG. 8B and FIG. 9, center system 3 can create keyword link file 32c.

Figure 14:
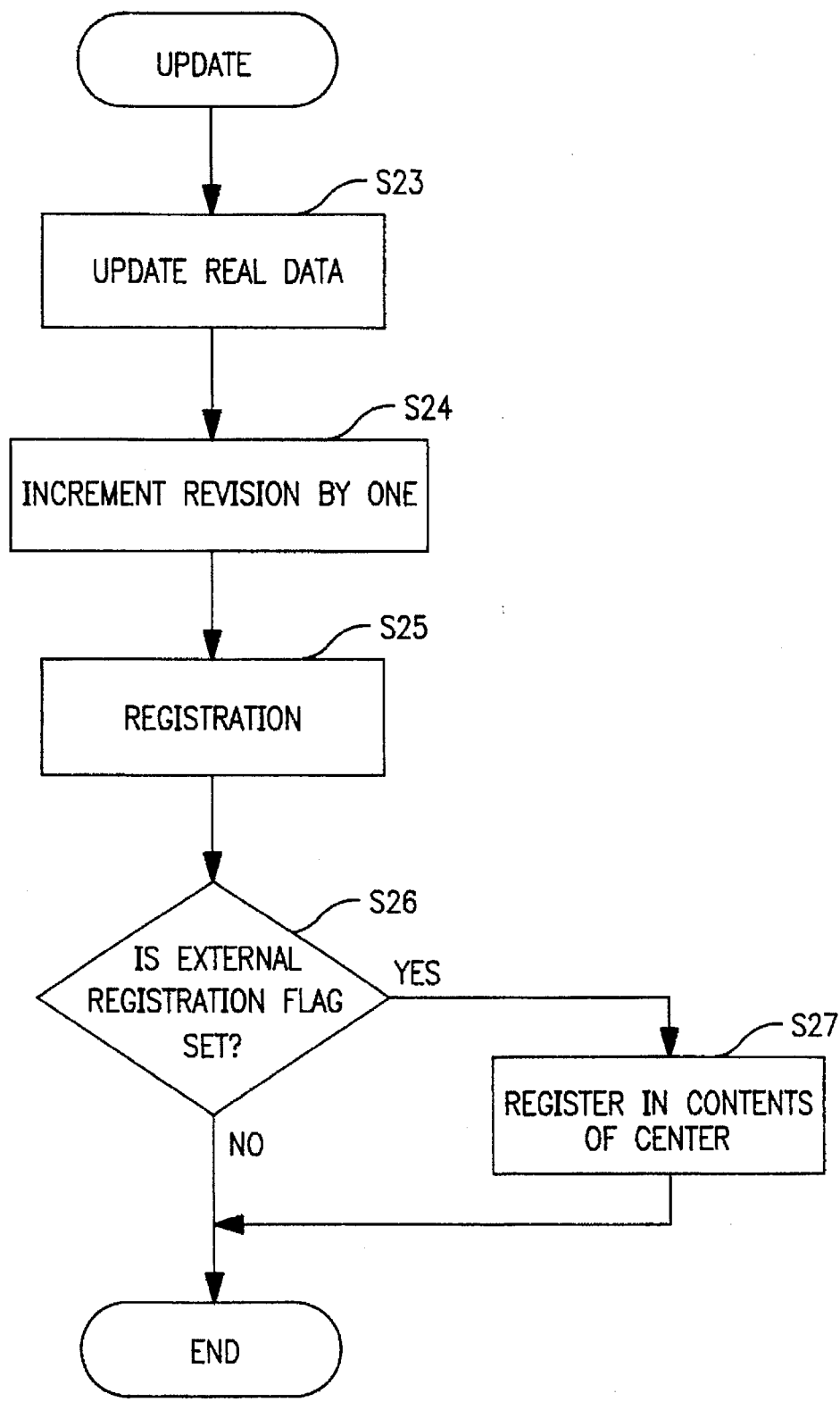
FIG. 14 shows an update flowchart.

FIG. 14 shows an updating of parts in this invention.

Real data of a part is updated and the updated real data is sorted in real data file 20 (step S23).

Next, the given terminal 1 increments the revision count (in parts file 13 of the part) by one (step S24).

Subsequently, registration explained above with regard to FIG. 13 is performed (step S25). After registration, terminal 1 checks if the flag of the part in parts file 13 is '1' (step S26).

A flag value of '1' indicates that the part can be registered externally. Since the part was registered externally during previous registration (FIG. 13F), terminal 1 sends indication of the update to center system 3. In other words, a re-registration request, as well as a screen name and new revision, is sent to center system 3 (step S27). In center system 3, data contents 34 is updated and given a new revision.

When the flag is zero, step S27 is not executed. The part cannot be registered externally and is data used by that terminal 1 only.

The following explains retrieval of part in this invention with reference to FIG. 15.

Figure 15A:
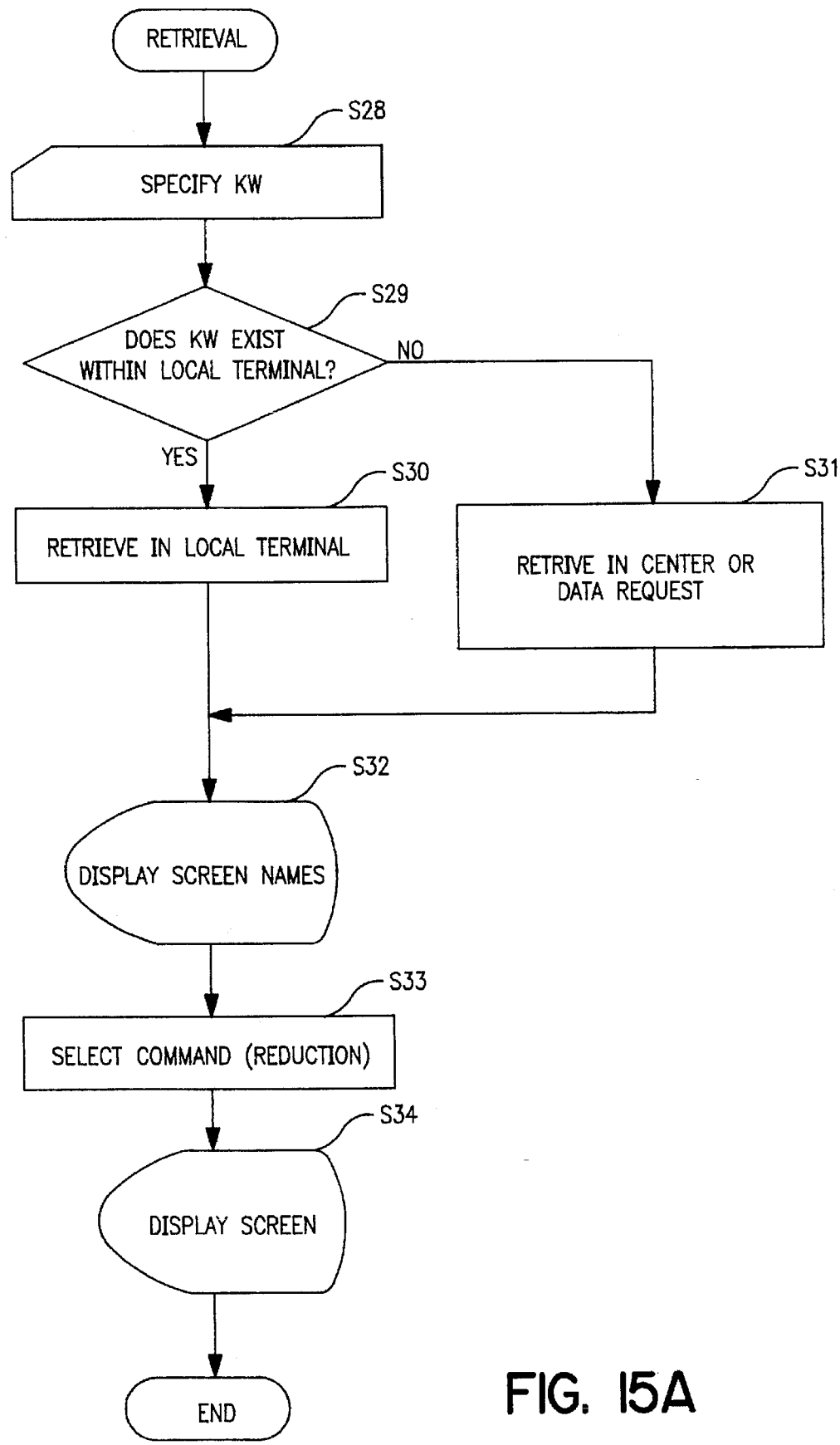

FIG. 15A shows the general flow of retrieval processing.

When the display screen of the desired part is retrieved and displayed in display 10a of terminal 1, terminal 1 brings up the keyword selection (specification) screen through interaction with an operator. Terminal 1 then displays keywords, and the operator selects the keyword of the screen to be retrieved (step S28).

Figures 15B, 15C:
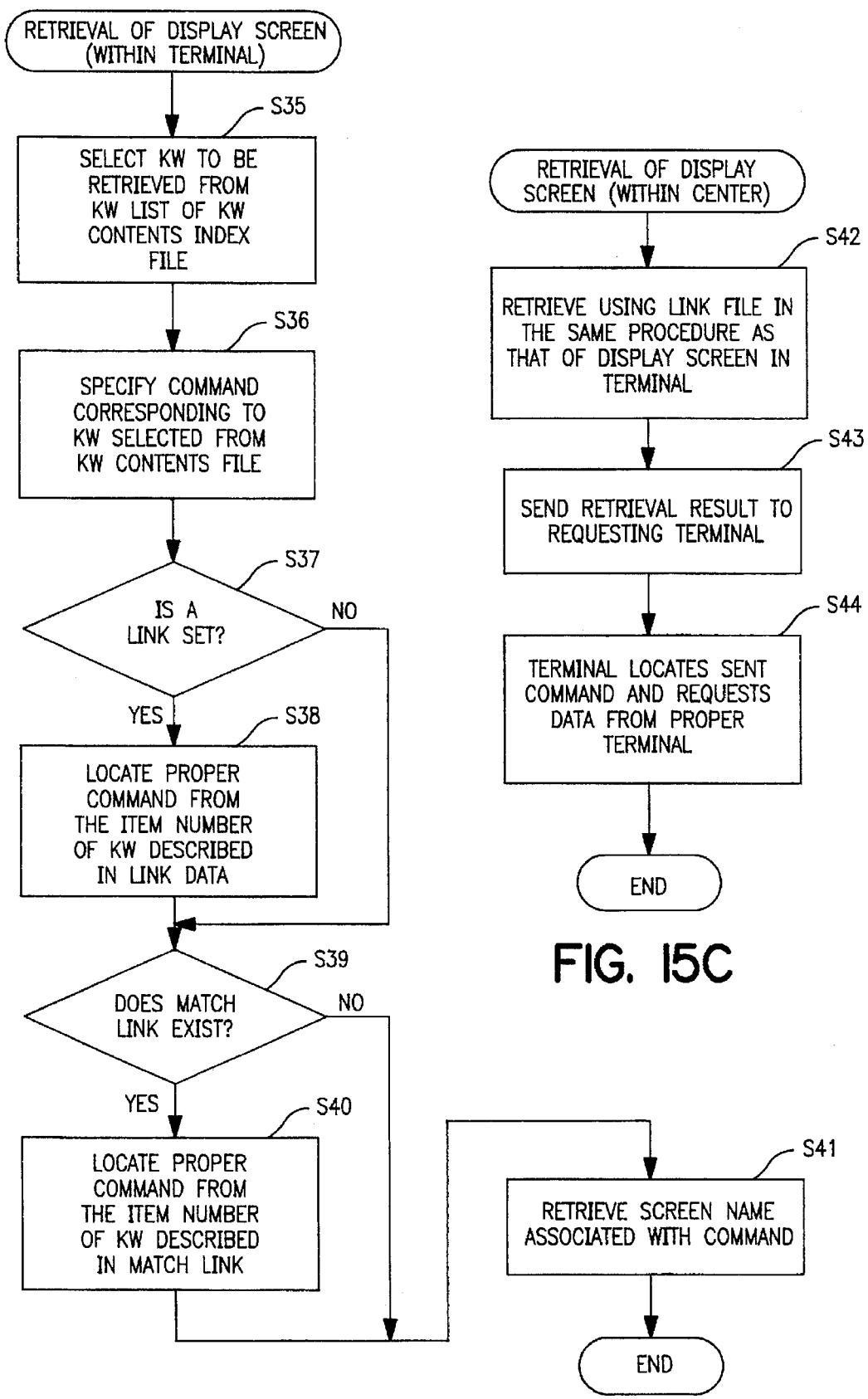

Terminal 1 retrieves its own keyword contents index file 16b to determine whether the selected keyword exists in the terminal 1 (step S29). When the keyword exists in the terminal 1, retrieval processing is performed in that terminal (step S30). This process is shown in FIG. 15B.

When the keyword does not exist in the terminal 1, the terminal 1 issues a retrieval request to center system 3 which performs retrieval processing. Based on retrieval results from center system 3, the terminal 1 requests data corresponding to the keyword from other terminals (step S31). This process is shown in FIG. 15C.

The screen name of a part obtained in steps S30 and S31 is displayed in display 10a (S32).

Figure 15D:
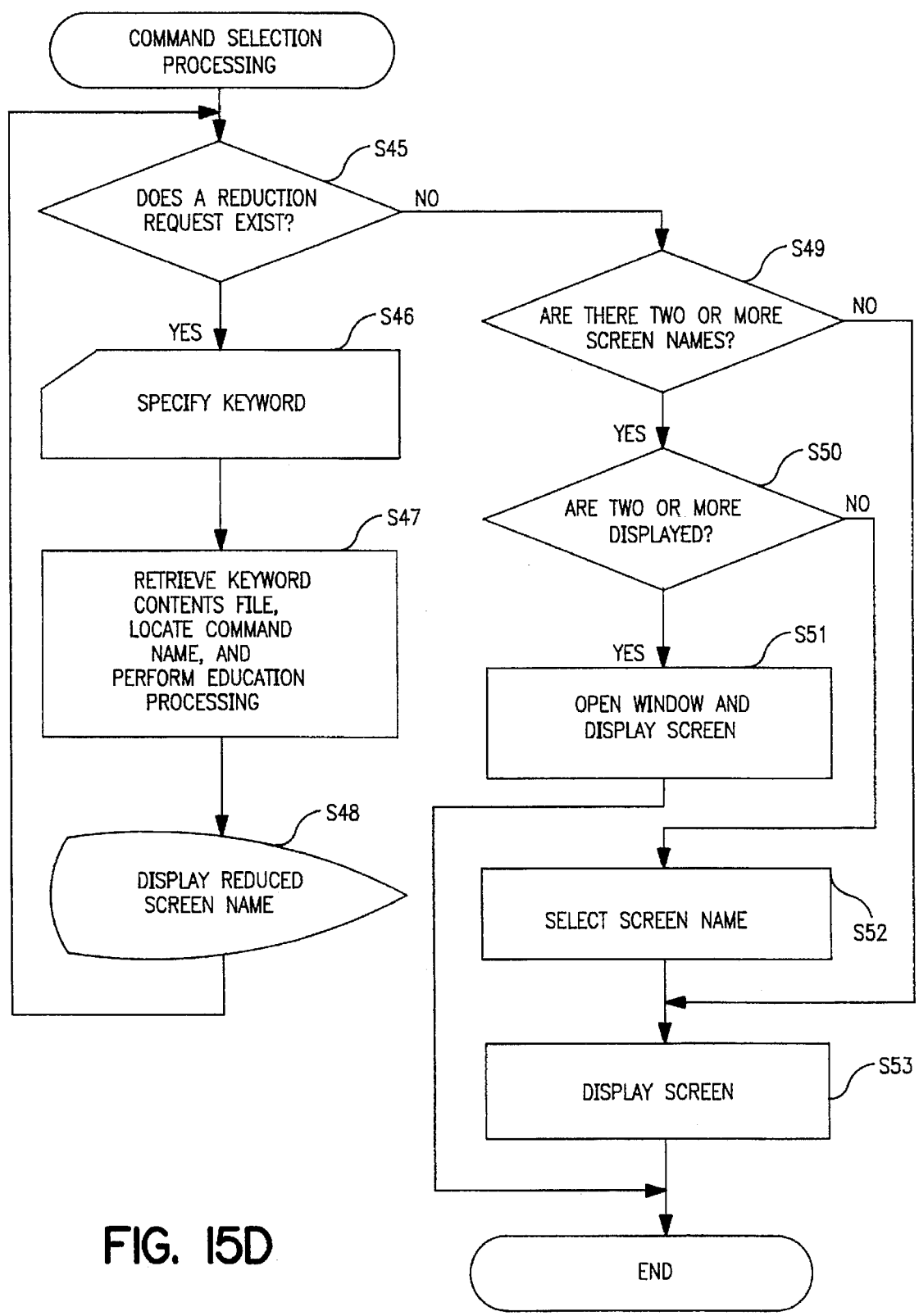
Figure 16:
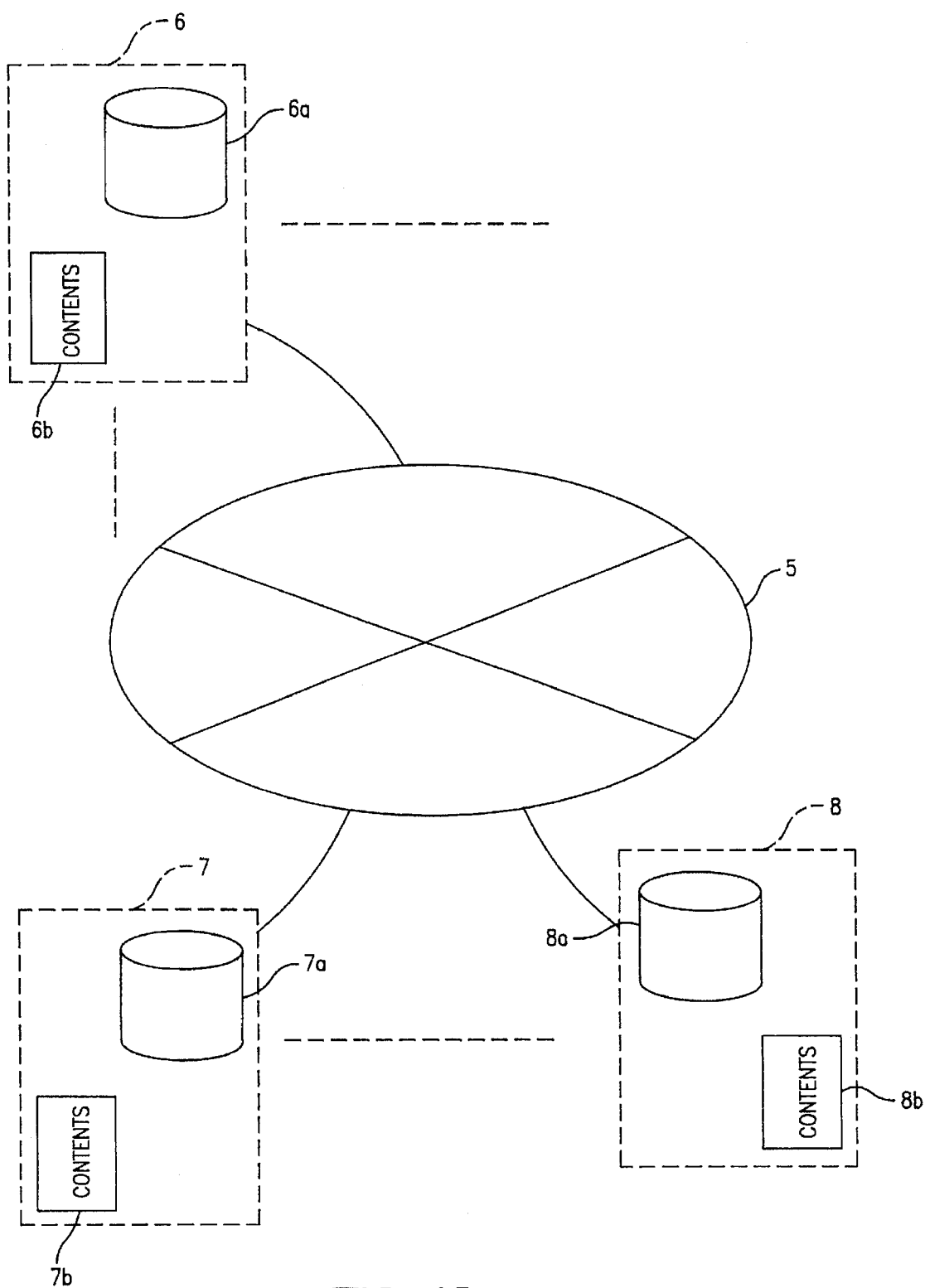
FIG. 16 shows a configuration diagram of a traditional distributed database system.

Since usually more than one screen name is displayed in step S32, the following is done: terminal 1 selects appropriate commands or screen names as required through interaction with the operator (step S33). This process is shown in FIG. 15D.

The display screen determined by this process is displayed in display 10a (step S34).

FIG. 15B shows retrieval processing in local terminal 1.

Through interaction with an operator, terminal 1 calls keyword contents index file 16b, displays the keywords, and selects the keyword of the screen to be retrieved (step S35). Next, terminal 1 calls and retrieves keyword contents file 16c, and locates the command name(s) associated with a specified keyword (step S36). Terminal 1 then determines whether an inter-record item number link exists in keyword contents file 16c displayed on the screen (step S37).

When such link data exists, terminal 1 locates the proper command name using the item number of the keyword indicated by the link data (step S38).

In other words, as shown in FIG. 5, when, for example, the keyword exists of item number 0100020 is specified, terminal 1 also locates the command of item number 0100021 of the next record using item number ③ in keyword contents file 16c. On the other hand, when link data does not exist, terminal 1 skips step S38 and executes step S39.

Terminal 1 then determines if a match link exists in keyword contents file 16c displayed on the screen (step S39).

When link data exists, terminal 1 locates the proper command name using the item number of the keyword indicated by match link data (step S40). In other words, as shown in FIG. 7, specifying the keyword of item number 002 is equivalent to specifying the three keywords existing in item numbers 002, 003, and 005, because the match link data indicates item numbers 003 and 005. Other keywords are registered in match link data. Likewise, the item numbers of the source keywords are registered in the match link data of the other keywords.

On the other hand, when link data does not exist, terminal 1 skips step S40 and executes step S41.

Terminal 1 obtains the screen name located by steps S36, S38, and S40 (step S41), and displays it in display 10a (step S32).

A screen name is located using a command name for the following reasons. As described above, the procedural meaning of a part is described in a command. The data processing section in terminal 1 and center system 3 sends and receives the command as a message. By doing this, data processing is performed. Therefore, terminal 1 and center system 3 basically handle parts according to the command. When notifying the operator, terminal 1 and center system 3 display something equivalent to the command name. This is usually a screen name (character string) which can be understood by the operator. Consequently, a proper display screen can be located even when a screen name is changed later.

FIG. 15C shows retrieval processing in center system 3.

In some cases the display screen of a part of a specified keyword is not in the terminal itself. In this case, terminal 1 accepts specification of a keyword through interaction with the operator. It then sends the accepted keyword to center system 3 (step S31).

Center system 3 retrieves link file 32 in the same procedure as retrieval processing in terminal 1. It locates the command corresponding to the keyword (Step S42). In other words, terminal 3 performs the same processing as step S35 using keyword link index file 32b. It also performs the same processing as steps S36 to S40 using keyword link file 32c.

Center system 3 sends the command names located in step S42 to the terminal 1 requesting the retrieval (step S43).

Upon receiving the result of the retrieval, terminal 1 displays the received command names in display 10a. It then selects one of two or more command names through interaction with the operator. To the request data, terminal 1 sends the command name to the terminal 1 with the real data of the part corresponding to the located command (step S44).

The terminal 1 receiving the command name reads the display screen data of the part associated with the command name from its own real data file 20. It does this via its own parts conversion table 21 and sends it to the requesting terminal 1. When keyword link file 32c in center system 3 does not manage command names, terminal 1 reads the display screen of the part by having the keyword sent.

Upon receipt of the data, the requesting terminal 1 stores it in its own real data file 20. It then registers the data as shown in FIG. 13.

Subsequently, terminal 1 obtains the screen name associated with the command name in the same way as step S41 and displays it in display 10a (step S32).

As described above, center system 3 determines which terminal 1 should perform retrieval processing. Because of this, speed of retrieval of the display screen can be increased considerably. For retrieval of more than one display screen, requests for both display screens are issued to center system 3 together and retrieval results are also reported together. For example, received command names are displayed repeatedly as many times as the screens.

FIG. 15D shows command selection processing.

Usually, more than one screen name is displayed in step 32. Terminal 1 determines whether the operator wishes to further reduce the number of screen names. This is done using another keyword (step S45).

Upon receipt of request to reduce the number of screens, terminal 1 accepts specification of the next keyword (step S46). Next, terminal 1 retrieves keyword contents file 16c. This is done in order to locate one or more command names associated with the specified keyword. Next, the corresponding screen names are obtained according to parts file 13. In addition, the terminal 1 locates screen names identical to those having been obtained up to this time. The terminal 1 reduces the number of screens using this process (step S47). The terminal 1 displays a list of the edited screen names in display 10a (step S48) and returns to step S24.

Sometimes no reduction request is issued in step S45. In this case, the terminal 1 determines whether more than one screen name has been located (step S49). It also determines whether more than one screen is displayed (step S50). In the case that more than one screen name is located and a request to display more than one display screen is made, terminal 1 opens a window and displays the located display screens (step S51). On the other hand, sometimes more than one screen name is located and a request to display one display screen is made. In this case terminal 1 selects the screen name through interaction with the operator beginning in step 50 (step S52) and displays the selected display screen (step S53). When one display screen is located in step S49, terminal 1 displays the display screen (step S53). Steps S51 and S53 overlap with step S34.

A display screen is displayed as follows. Part conversion table 21 is retrieved to locate address information associated with a command name. Then the display screen data of corresponding part is read from real data file 20 according to the located address information.

As described above, this invention provides the capability to locate a proper command name in only one access to keyword contents file 16. This permits a proper display screen to be displayed in display 10a.

A distributed database system with the data retrieval method implemented by the invention is especially useful when fast data retrieval is required. It is particularly suitable when free data is to be retrieved quickly under the condition that there needs to be a minimum load on each terminal among a large number of terminals connected via a public network.

We claim:

1. A data retrieval method in a distributed database system comprising the steps of:
   (a) associating commands defining attributes of database data with at least one keyword in each of a plurality of terminals connected to a center system;
   (b) managing command names to which keywords are assigned in units of keywords in each of the terminals in dependence upon a keyword contents file in each of the terminals;
   (c) managing in the center system a terminal number of terminals in which keywords are registered in units of keywords in dependence upon a keyword link file in the center system; and
   (d) retrieving data in one of the terminals when a keyword is specified by locating a command name associated with a specified keyword in dependence upon one of a keyword contents file and a command name associated with a specified keyword located in the keyword contents file in the terminal specified by the terminal number located using the keyword link file.

2. A data retrieval method in a distributed database system as recited in claim 1, further comprising the step of:
   (e) registering data in the database with a display screen.

3. A data retrieval method in a distributed database system as recited in claim 1, further comprising the steps of:
   (e) managing command names associated with keywords in each of the terminals in dependence upon the keyword link file, in addition to terminal numbers; and
   (f) retrieving data in one of the terminals by locating the command name associated with a specified keyword by one of:
      (i) using the keyword contents file thereof; and
      (ii) locating the command name assigned to the terminal number located using the keyword link file in the center system.

4. A data retrieval method in a distributed database system as recited in claim 1, further comprising the steps of:
   (e) managing item numbers paired with keywords in each of the terminals in dependence upon the keyword contents file, and transmitting match link data indicating matches between keywords by item number; and
   (f) locating the command names associated with other keywords linked by the match link data when one of the terminals specifies a keyword.

5. A data retrieval method in a distributed database system as recited in claim 4, further comprising the steps of:
   (f) managing match link data in each of the terminals in dependence upon the keyword link file; and
   (g) locating the terminal numbers and command names associated with other keywords linked by the match link data when a keyword specified by one of the terminals is transmitted to the center system.

6. A data retrieval method in a distributed database system as recited in claim 4, further comprising the step of:
   (f) preparing temporarily in the keyword contents index file of each of the terminals item numbers paired with keywords before the keyword contents file is created.

7. A data retrieval method in a distributed database system as recited in claim 1, further comprising the steps of:
   (e) managing item numbers paired with keywords in each of the terminals in dependence upon the keyword contents file and link data linking data with a next record using the item number when the number of commands for a keyword exceeds a number that can be held in one record of the keyword contents file; and
   (f) locating the command name associated with a keyword specified by a terminal and other command names linked by the link data.

8. A data retrieval method in a distributed database system as recited in claim 7 further comprising the steps of:
   (g) managing link data in a keyword link file; and
   (h) locating the terminal number and command name associated with a keyword specified by a terminal, and other command names linked by the link data.

9. A data retrieval method in a distributed database system as recited in claim 7, further comprising the steps of:
   (g) managing first characters of keywords and associated item numbers in a keyword contents index management file, and managing keywords based on the item numbers of the management file in a keyword contents index file; and (h) sorting the keyword contents file in a specified character order using the management file to create the contents index file.

10. A data retrieval method in a distributed database system as recited in claim 1, further comprising the step of:
(e) selecting one of the terminals declared as a temporary center as the center system.

11. A distributed database system, comprising:

a plurality of terminals, more than one having distributed individual databases and each having a contents file, said contents file being adapted to store a correspondence between command names and keywords in units of keywords;

a public network, connecting said plurality of terminals; and a center system having a link file which is adapted to allow management of information for locating those of said terminals in which a given keyword is registered, each of said plurality of terminals accessing said center system when a given keyword is requested and the given keyword is not registered at that terminal.

12. A distributed database system as recited in claim 11, wherein the contents file comprises:

a keyword contents index management file which stores first characters of keywords and relates said characters of keywords to start item numbers of the first characters;

a keyword contents index file which stores keywords according to detailed item numbers based on the start item numbers of the first characters; and a keyword contents file which stores keywords and related command names.

13. A distributed database system as recited in claim 12, wherein said link file and the contents file have a common configuration.

14. A distributed database system as recited in claim 12, wherein:

the keyword contents file comprises a plurality of records each containing a predetermined number of command names and when a predetermined number of command names is exceeded for a specified keyword, link data with a next record is registered in a record with the specified keyword.

15. A distributed database system as recited in claim 12, wherein the keyword contents file comprises a plurality of records, and when other keywords are related to a single keyword, match link data for establishing a link with the record having the keyword is stored in a record with the related keyword.

16. A distributed database system as recited in claim 11, wherein each of said terminals has a flag indicating whether data stored therein can be registered externally, and storage of said data is administered to said center system in dependence upon the flag.

17. A distributed database system as recited in claim 11, wherein said center system has a data contents file to allow for managing revision of data.

* * * * *